(12) United States Patent
Papasakellariou

(10) Patent No.: US 12,096,354 B2
(45) Date of Patent: Sep. 17, 2024

(54) CELL SELECTION FOR UPLINK TRANSMISSION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 17/653,829

(22) Filed: Mar. 7, 2022

(65) Prior Publication Data

US 2022/0295392 A1   Sep. 15, 2022

Related U.S. Application Data

(60) Provisional application No. 63/159,608, filed on Mar. 11, 2021.

(51) Int. Cl.
| | |
|---|---|
| H04W 72/04 | (2023.01) |
| H04L 1/1607 | (2023.01) |
| H04L 1/1829 | (2023.01) |
| H04W 48/20 | (2009.01) |
| H04W 72/0446 | (2023.01) |
| H04W 72/23 | (2023.01) |

(52) U.S. Cl.
CPC ........... *H04W 48/20* (2013.01); *H04L 1/1614* (2013.01); *H04L 1/1861* (2013.01); *H04W 72/0446* (2013.01); *H04W 72/23* (2023.01)

(58) Field of Classification Search
CPC .. H04L 1/1614; H04W 72/0446; H04W 72/23
See application file for complete search history.

(56) References Cited

U.S. PATENT DOCUMENTS 11,617,195 B2 *   3/2023   Huang .................. H04L 5/0048
                                                   370/329
2016/0249340 A1 *  8/2016   Cheng .................. H04L 1/1861
(Continued)

FOREIGN PATENT DOCUMENTS

EP          2922358 B1      5/2019

OTHER PUBLICATIONS

International Search Report and Written Opinion issued Jun. 13, 2022 regarding International Application No. PCT/KR2022/003440, 17 pages.

(Continued)

*Primary Examiner* — Fahmida S Chowdhury

(57) ABSTRACT

Methods and apparatuses for cell selection for uplink transmission. A method for operating a user equipment includes receiving: a bitmap mapping to a number of slots on a primary cell. The mapping repeats periodically over the number of slots. The bitmap indicates the primary cell or a secondary cell. The method further includes receiving information for first parameters associated with transmission of a physical uplink control channel (PUCCH) on the primary cell and information for second parameters associated with transmission of a PUCCH on the secondary cell. The method further includes determining, based on the bitmap, a first cell to transmit a first PUCCH in a slot of the first cell and transmitting the first PUCCH in the slot on the first cell.

20 Claims, 11 Drawing Sheets

(56) References Cited

U.S. PATENT DOCUMENTS

| | | | |
|---|---|---|---|
| 2017/0208582 A1* | 7/2017 | Liang | H04W 28/18 |
| 2017/0347326 A1 | 11/2017 | Dinan | |
| 2018/0279229 A1 | 9/2018 | Dinan et al. | |
| 2019/0335493 A1 | 10/2019 | Xiong et al. | |
| 2020/0022210 A1 | 1/2020 | Heo et al. | |
| 2021/0135946 A1* | 5/2021 | Babaei | H04L 1/1896 |
| 2021/0314937 A1* | 10/2021 | Huang | H04L 5/001 |
| 2021/0391955 A1* | 12/2021 | He | H04L 5/001 |
| 2022/0240228 A1* | 7/2022 | Matsumura | H04L 1/1861 |
| 2023/0006798 A1* | 1/2023 | Lee | H04L 1/1607 |
| 2023/0247647 A1* | 8/2023 | Kumagai | H04W 72/232 370/329 |
| 2023/0403715 A1* | 12/2023 | Yuan | H04L 1/1896 |
| 2024/0023081 A1* | 1/2024 | Kumagai | H04L 1/18 |

OTHER PUBLICATIONS

"5G; NR; Physical channels and modulation (3GPP TS 38.211 version 16.4.0 Release 16)", ETSI TS 138 211 V16.4.0, Jan. 2021, 137 pages.

"5G; NR; Multiplexing and channel coding (3GPP TS 38.212 version 16.4.0 Release 16)", ETSI TS 138 212 V16.4.0, Jan. 2021, 155 pages.

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Medium Access Control (MAC) protocol specification (3GPP TS 38.321 version 16.3.0 Release 16)", ETSI TS 138 321 V16.3.0, Jan. 2021, 158 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

Extended European Search Report issued May 21, 2024 regarding Application No. 22767553.5, 9 pages.

Moderator (Nokia), "Moderator summary #2 on HARQ-ACK feedback enhancements for NR Rel-17 URLLC/IIoT", 3GPP TSG-RAN WG1 Meeting #104-e, R1-2101818, Jan. 2021, 174 pages.

* cited by examiner

CELL SELECTION FOR UPLINK TRANSMISSION

CROSS-REFERENCE TO RELATED APPLICATION AND CLAIM OF PRIORITY

This application claims priority under 35 U.S.C. § 119(e) to U.S. Provisional Patent Application No. 63/159,608 filed on Mar. 11, 2021. The above-identified provisional patent application is hereby incorporated by reference in its entirety.

TECHNICAL FIELD

The present disclosure relates generally to wireless communication systems and, more specifically, the present disclosure relates to cell selection for uplink transmission.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to cell selection for uplink transmission.

In one embodiment, a method is provided. The method includes receiving: a bitmap mapping to a number of slots on a primary cell. The mapping repeats periodically over the number of slots. The bitmap indicates the primary cell or a secondary cell. The method further includes receiving information for first parameters associated with transmission of a physical uplink control channel (PUCCH) on the primary cell and information for second parameters associated with transmission of a PUCCH on the secondary cell. The method further includes determining, based on the bitmap, a first cell to transmit a first PUCCH in a slot of the first cell and transmitting the first PUCCH in the slot on the first cell.

In another embodiment, a user equipment (UE) is provided. The UE includes a transceiver configured to receive: a bitmap mapping to a number of slots on a primary cell, where the mapping repeats periodically over the number of slots and the bitmap indicates the primary cell or a secondary cell; information for first parameters associated with transmission of a PUCCH on the primary cell; and information for second parameters associated with transmission of a PUCCH on the secondary cell. The UE further includes a processor operably coupled to the transceiver. The processor is configured to determine, based on the bitmap, a first cell to transmit a first PUCCH in a slot of the first cell. The transceiver is further configured to transmit the first PUCCH in the slot on the first cell.

In yet another embodiment, a base station (BS) is provided. The BS includes a transceiver configured to transmit: a bitmap mapping to a number of slots on a primary cell, where the mapping repeats periodically over the number of slots and the bitmap indicates the primary cell or a secondary cell; information for first parameters associated with transmission of a PUCCH on the primary cell; and information for second parameters associated with transmission of a PUCCH on the secondary cell. The BS further includes a processor operably coupled to the transceiver. The processor is configured to determine, based on the bitmap, a first cell to receive a first PUCCH in a slot of the first cell. The transceiver is further configured to receive the first PUCCH in the slot on the first cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
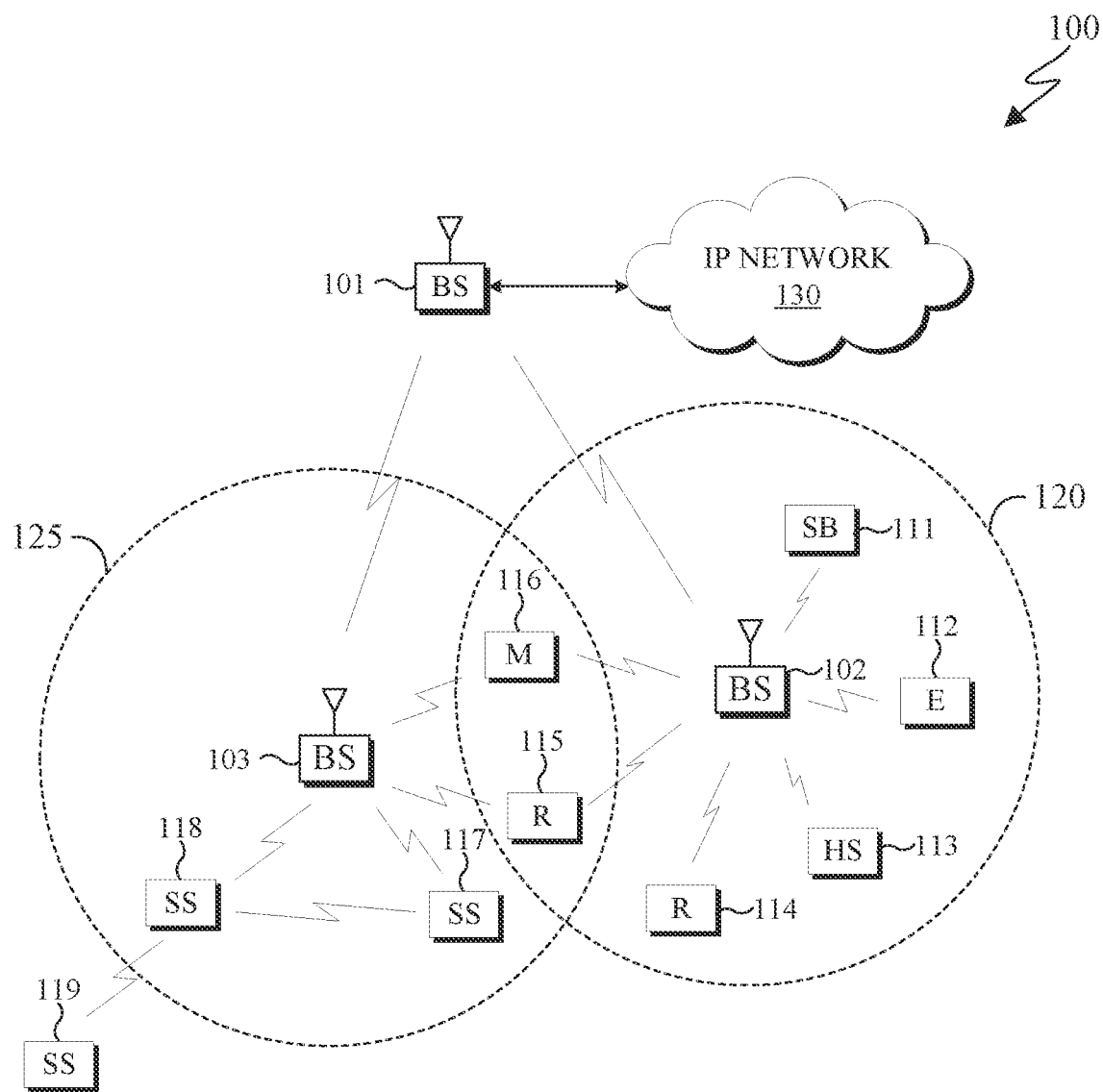
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation" ("REF1"); 3GPP TS 38.212 v16.4.0, "NR; Multiplexing and Channel coding" ("REF2"); 3GPP TS 38.213 v16.4.0, "NR; Physical Layer Procedures for Control" ("REF3"); 3GPP TS 38.214 v16.4.0, "NR; Physical Layer Procedures for Data" ("REF4"); 3GPP TS 38.321 v16.3.0, "NR; Medium Access Control (MAC) protocol specification" ("REF5"); and 3GPP TS 38.331 v16.3.1, "NR; Radio Resource Control (RRC) Protocol Specification." ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
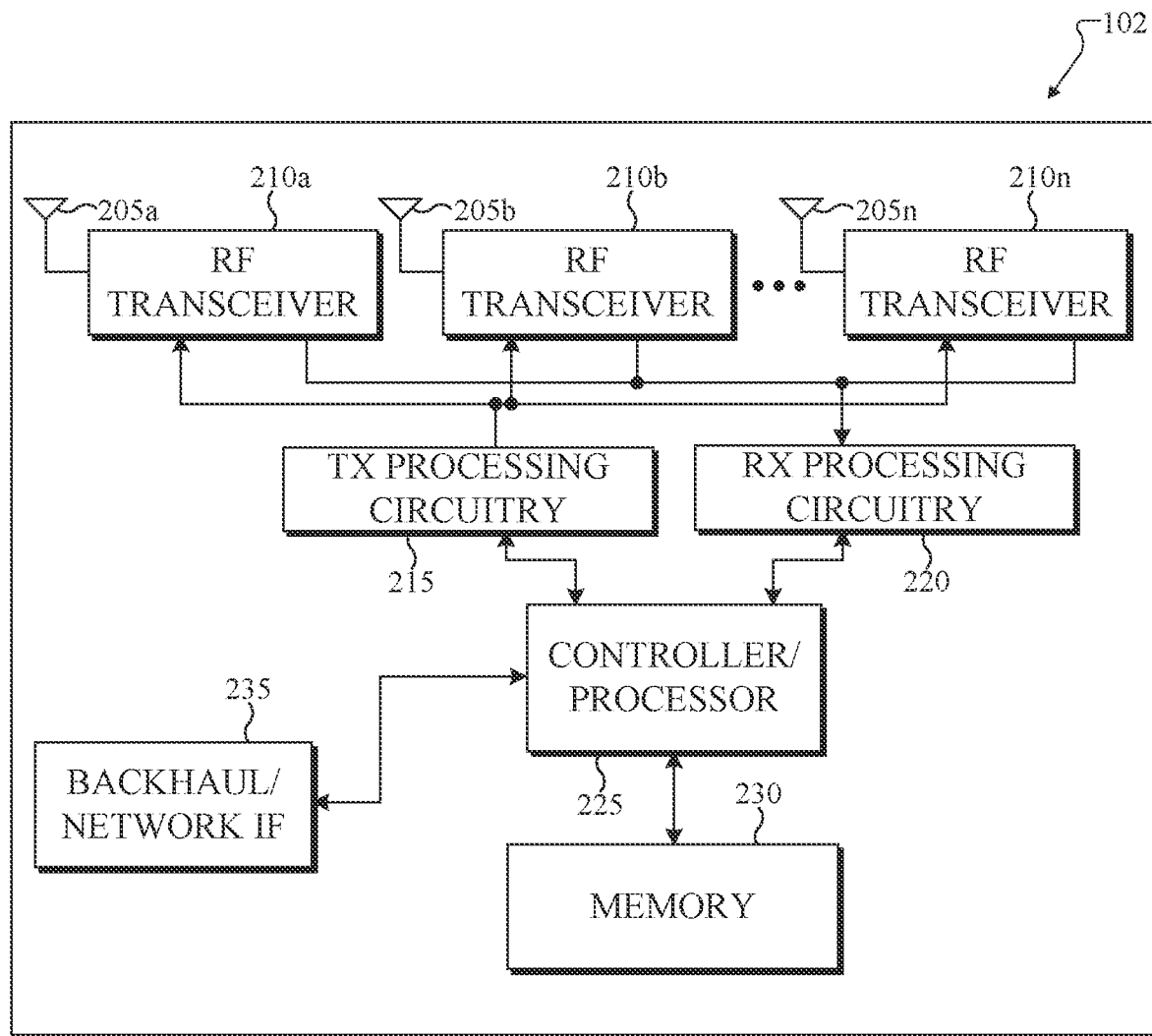
FIG. 2 illustrates an example base station (BS) according to embodiments of the present disclosure.
Figure 3:
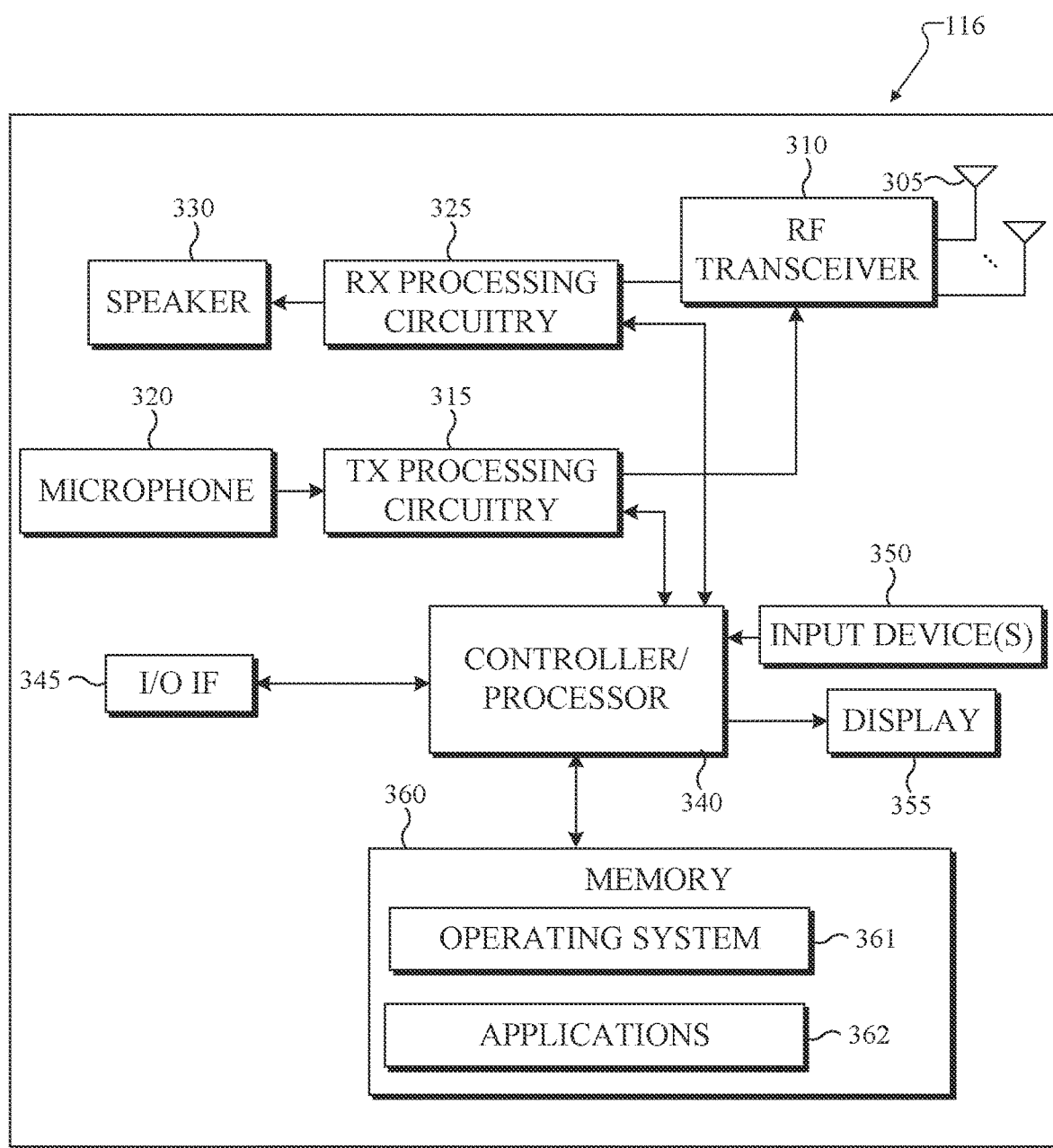
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network, various changes may be made to FIG. 1. For example, the wireless network could include any number of BSs and any number of UEs in any suitable arrangement.

Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support cell selection for uplink transmission. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
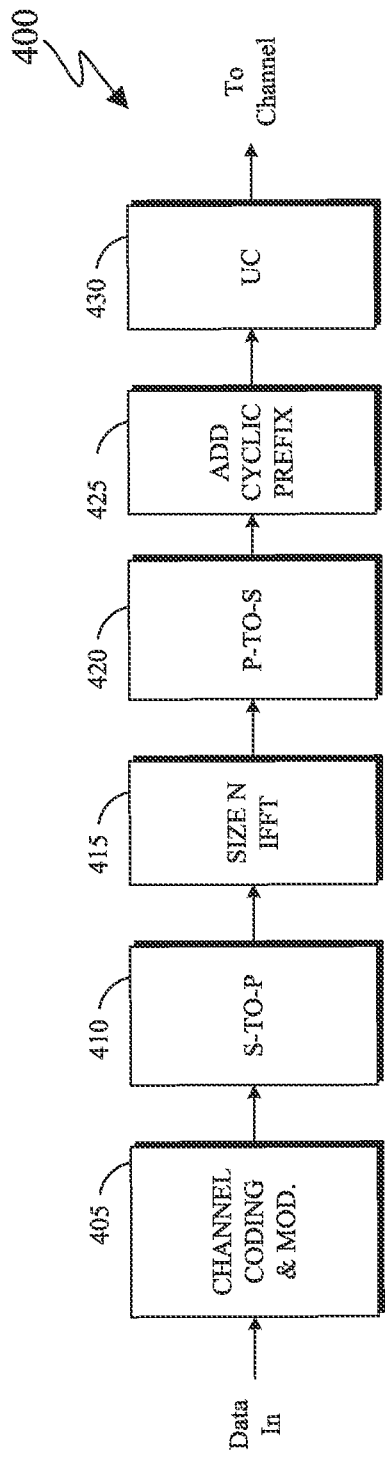
FIGS. 4 and 5 illustrate example wireless transmit and receive paths according to embodiments of the present disclosure.
Figure 5:
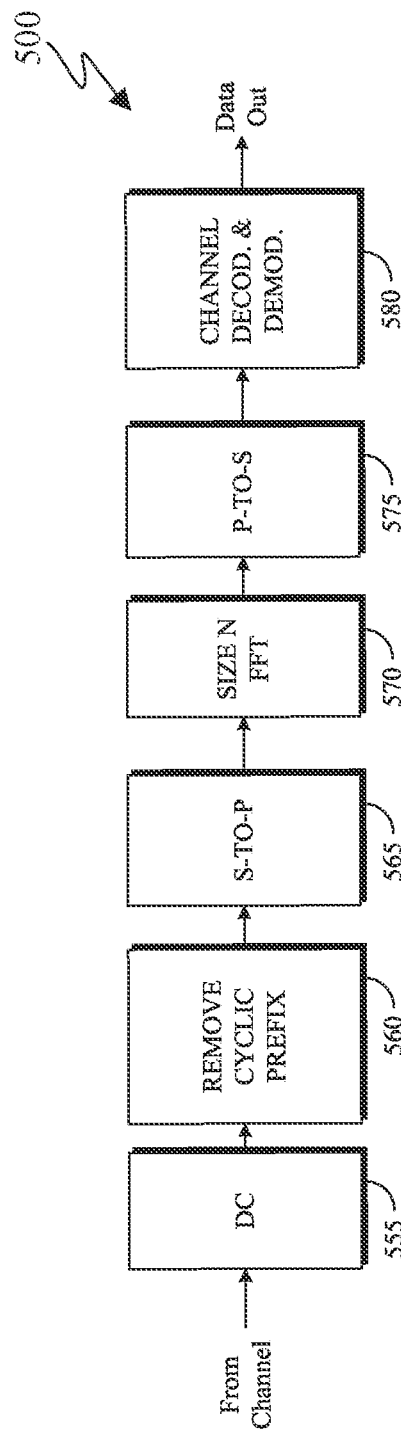

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support cell selection for uplink transmission as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Downlink (DL) transmissions from a gNB (such as the BS 102) and uplink (UL) transmissions from a UE (such as the UE 116) can be based on an OFDM waveform including a variant using DFT precoding that is known as DFT-spread-OFDM (see also REF1).

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^\mu \cdot 15$ kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB (such as BS 102) transmits data information or DCI through respective physical DL shared channels (PDSCHs) or physical DL control channels (PDCCHs). A PDSCH or a PDCCH can be transmitted over a variable number of slot symbols including one slot symbol.

A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception. A TB transmission can be an initial one or a retransmission as identified by a new data indicator (NDI) field in the DCI format scheduling a PDSCH reception that provides a TB retransmission for a given HARQ process number.

In certain embodiments, a gNB (such as BS 102) transmits one or more of multiple types of RS including channel state information RS (CSI-RS) and demodulation RS (DM-RS)—see also REF.

A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF3). The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB (see also REF5). A DM-RS is typically transmitted only within a BW of a respective PDCCH or PDSCH and a UE can use the DM-RS to demodulate data or control information.

Certain UL signals also include data signals conveying information content, control signals conveying UL control information (UCI), DM-RS associated with data or UCI demodulation, sounding RS (SRS) enabling a gNB (such as the BS 102) to perform UL channel measurement, and a random access (RA) preamble enabling a UE to perform random access (see also REF1). A UE (such as the UE 116) transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

A PUSCH transmission can be (i) scheduled by a DCI format and is referred to as dynamic grant PUSCH (DG-PUSCH), (ii) configured by higher layers and autonomously transmitted by the UE and is then referred to as configured grant PUSCH (CG-PUSCH) Type 1, or (iii) activated by a DCI format and is then referred to as CG-PUSCH Type 2, as described in REF4. PUSCH transmissions or PUCCH transmissions from a UE can have different priorities, wherein a priority is indicated by a DCI format or is configured by higher layers as described in REF3.

A UE can transmit a PUSCH or a PUCCH with a number of repetitions that is indicated by an associated DCI format or by higher layers. The UE can be configured to transmit a PUSCH with Type-A repetitions or with Type-B repetitions as described in REF4. For Type-A repetitions, same symbols are used in each slot where the UE transmits a repetition of a PUSCH. For Type-B repetitions, the number of repetitions is defined an indicated number of symbols (nominal repetitions) while a number of actual repetitions can be larger than a number of nominal repetitions and a number of symbols in a slot can be different for different actual repetitions as described in REF4.

Certain UCI includes HARQ-acknowledgement (HARQ-ACK) information, indicating correct or incorrect decoding of transport blocks (TBs) or of code block groups (CBGs) in a PDSCH, scheduling request (SR) indicating whether a UE (such as the UE 116) has data in its buffer to transmit, and CSI reports enabling a gNB (such as the BS 102) to select appropriate parameters for PDSCH/TB or PDCCH/DCI format transmissions to a UE. A UE can transmit a PUCCH on a primary cell of a cell group. The primary cell has the smallest index, equal to 0, of all cells in the cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ_feedback timing indicator field in the DCI format, from a set of slot timing values $K_1$, or indicated by higher layers in case of a SPS PDSCH reception.

Certain UL RS includes DM-RS and SRS. DM-RS is typically transmitted within a BW of a respective PUSCH or PUCCH. A gNB (such as the BS 102) can use a DM-RS to demodulate information in a respective PUSCH or PUCCH. SRS is transmitted by a UE (such as the UE 116) to provide a gNB (such as the BS 102) with an UL CSI and, for a TDD system, to also provide a precoding matrix indicator (PMI) for DL transmission. Further, as part of a random access procedure or for other purposes, a UE can transmit a physical random access channel (PRACH).

Figure 6:
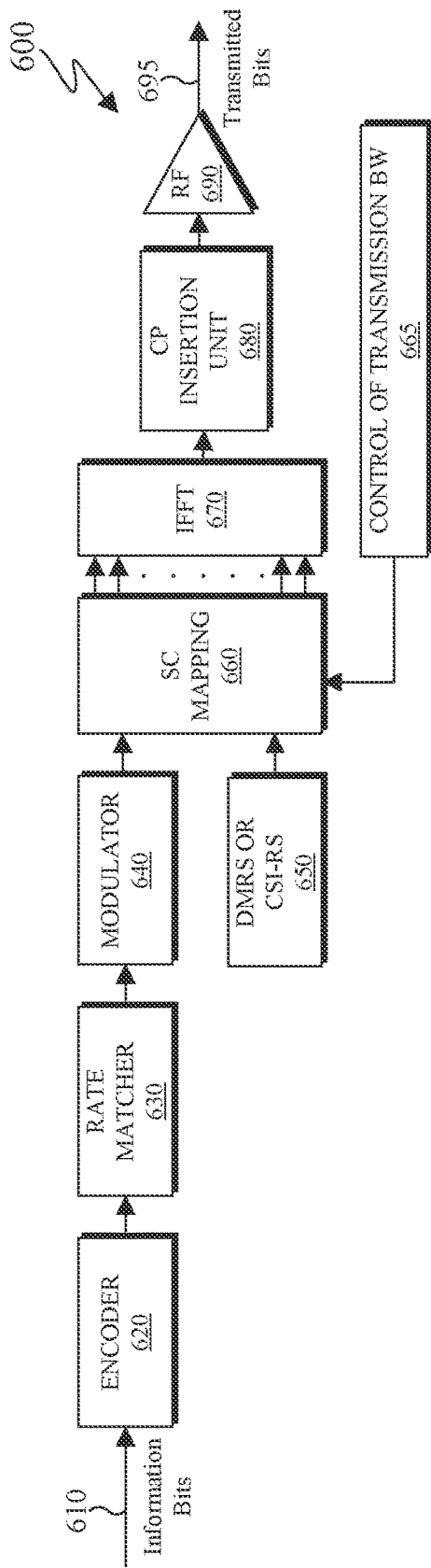
FIG. 6 illustrates a block diagram of an example transmitter structure using orthogonal frequency division multiplexing (OFDM) according to embodiments of the present disclosure.
Figure 7:
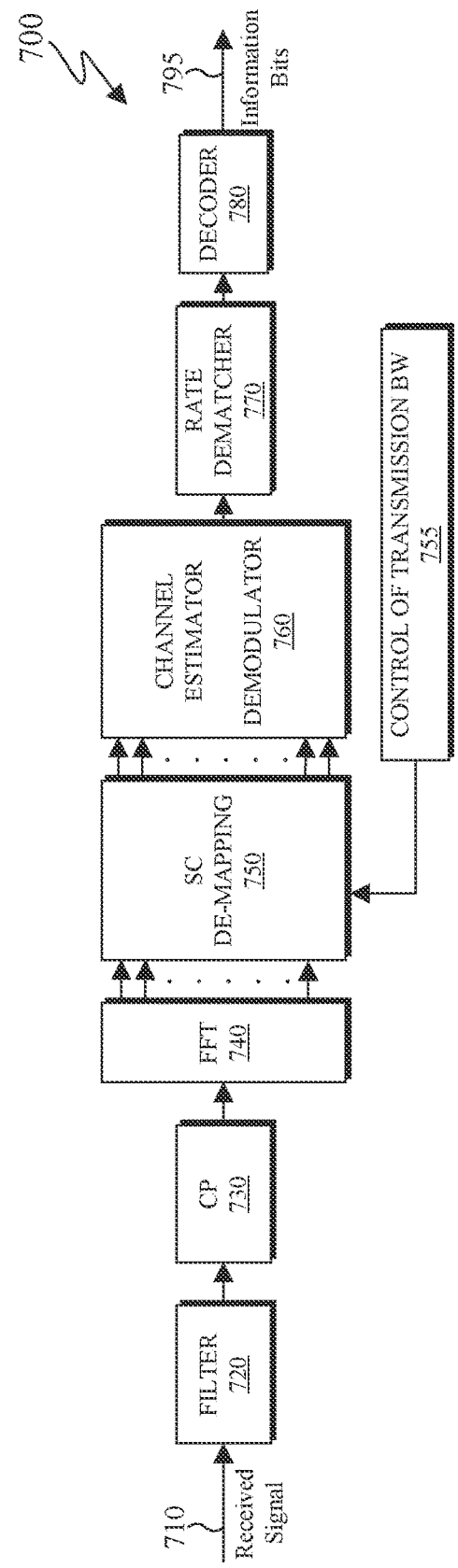
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210*a*-210*n* of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) reports HARQ-ACK information in response to correct or incorrect detection of a DCI format together with HARQ-ACK information in response to correct of incorrect detection of TBs. For example, the HARQ-ACK information for a detection of a DCI format can be for a DCI format indicating an SPS PDSCH release or for a DCI format indicating a dormant/non-dormant bandwidth part (BWP) for a cell from a group of cells, and so on. A UE can also be configured to report HARQ-ACK information for a configured number of CBGs per TB as described in REF3. For brevity, unless explicitly otherwise mentioned, only HARQ-ACK information in response to correct or incorrect reception of TBs is subsequently considered but it should be understood that HARQ-ACK information can also be in response to additional reception outcomes.

For a PUCCH transmission from a UE that includes HARQ-ACK information that is associated with a DCI format, the UE determines a PUCCH resource based on a PUCCH resource indication field in the DCI format. For example, with reference to slots of a PUCCH transmission on the primary cell, a DCI format can include a PDSCH-to-HARQ_feedback timing indicator field that indicates a slot for a PUCCH transmission with HARQ-ACK information associated with the DCI format as described in REF3, for example relative to a slot of a PDSCH reception scheduled by the DCI format. If the DCI format does not include the PDSCH-to-HARQ_feedback timing indicator field, the slot for the PUCCH transmission is provided by higher layers. The DCI format can also include a PUCCH resource indicator field that indicates a PUCCH resource, from a set of PUCCH resources, for the PUCCH transmission. The UE determines the set of PUCCH resources based on the HARQ-ACK information payload. The UE determines the PUCCH resource based on a value of a PUCCH resource indicator field in a last DCI format that the UE correctly receives and generates corresponding HARQ-ACK information that is included in a PUCCH transmission using the PUCCH resource. The last DCI format is provided by a PDCCH reception that starts after all other PDCCH receptions providing DCI formats with corresponding HARQ-ACK information multiplexed in a same PUCCH. In case of multiple last PDCCH receptions that start at a same symbol and provide DCI formats scheduling PDSCH receptions on respective multiple cells, the last PDCCH reception is the one corresponding to a cell from the multiple cells with a largest cell index. In case the DCI formats indicate a priority for the HARQ-ACK information, the last DCI format is among DCI formats indicating a same or similar priority. For a PUCCH transmission that does not include HARQ-ACK information associated with a DCI format, a UE determines a slot based on a PDSCH-to-HARQ_feedback timing indicator field and a PUCCH resource within the slot for the PUCCH transmission based on parameters provided to the UE from a serving gNB by higher layer signaling.

For a PUCCH transmission with HARQ-ACK information in response to an SPS PDSCH reception and with reference to slots for PUCCH transmissions, a slot for a PUCCH transmission can be indicated by a DCI format activating the SPS PDSCH reception relative to the slot of the SPS PDSCH reception or, if the DCI format does not include a PDSCH-to-HARQ_feedback timing indicator field, by higher layer signaling. For SPS PDSCH receptions, such as ones after the first SPS PDSCH reception, a PUCCH resource for a PUCCH transmission with corresponding HARQ-ACK information may not be valid because, for example, the PUCCH resource may include a DL symbol or a symbol used for reception of synchronized signal (SS) physical broadcast channel (PBCH) blocks. Then, the UE can postpone the PUCCH transmission with the HARQ-ACK information to an earliest subsequent slot where the PUCCH resource is valid. The UE can also be provided by higher layers a maximum number of slots that the UE can postpone the PUCCH transmission, relative to the slot indicated by the DCI format activating the SPS PDSCH receptions, until a valid PUCCH resource exists in a slot. The UE can drop the PUCCH transmission when a valid PUCCH resource does not exist in a maximum number of slots after the slot indicated by the DCI format activating the SPS PDSCH receptions.

A UE can have several time-overlapping PUCCH transmissions in a slot. When the UE is configured or specified to multiplex UCI from the overlapping PUCCH transmissions in the slot in a single PUCCH transmission in the slot, the UE determines a PUCCH resource for the PUCCH transmission subject to timeline conditions as described in REF3. For determining whether a first PUCCH transmission overlaps with a second PUCCH transmission, the UE first determines whether corresponding PUCCH resources are valid. A PUCCH resource is valid when it (i) does not include DL symbols, for example as determined by an UL-DL configuration provided by higher layers, or (ii) does not include symbols used for transmission of cell specific signals such as SS/PBCH blocks, or a core resource set (CORESET) used for PDCCH transmissions associated with a Type-0 common search space set, and the like as described in REF3. Otherwise, the PUCCH resource is invalid. When a UE would transmit PUCCHs with different priorities in a slot and the UE is not configured to multiplex UCI of different priorities in a same PUCCH, a PUCCH resource for a PUCCH transmission with a first priority is invalid when it overlaps with a PUCCH resource for a PUCCH transmission with a second priority and the first priority is smaller than the second priority.

The UE resolves overlapping among PUCCH transmissions in a slot according to the following procedure (three steps). In a first step, the UE excludes PUCCH transmissions that use invalid PUCCH resources.

In a second step the UE would transmit PUCCHs with different priorities in a slot and the UE is not configured to multiplex UCI types of different priorities, such as two priorities, in a same PUCCH. For example, the UE first resolves overlapping among PUCCHs of priority 0 without considering PUCCHs of priority 1. The UE excludes any invalid PUCCH resource for PUCCH of priority 0 that results during the overlapping resolution procedure and determines a final PUCCH resource for a PUCCH transmission of priority 0, when any. The UE then resolves overlapping among PUCCH resources for PUCCHs of priority 1 and determines a final PUCCH resource for a PUCCH transmission of priority 1.

In a third step, the UE determines whether the PUCCH resource for the PUCCH transmission of priority 0 or the PUCCH resource for the PUCCH transmission of priority 1 is valid and, if so, the UE transmits the corresponding PUCCH; otherwise, the UE does not transmit the corresponding PUCCH.

Many frequency bands are flexible duplex bands where receptions by a UE (or transmissions from a gNB) and transmissions from the UE (or receptions by a gNB) are based on TDD. For example, most bands for 5G/NR are TDD bands. TDD operation offers some important advantages, such as using a same band for DL and UL transmissions leading to simpler UE implementation, for example as a duplexer is not required, and being able to exploit channel reciprocity between DL and UL to provide accurate link adaptation. However, TDD operation also has some important disadvantages such increased latency, due to transmission/reception in a link direction (UL or DL) is not possible at all times, reduced data rates, and reduced coverage for a given latency compared to FDD.

To address some of the disadvantages for TDD operation, a dynamic adaptation of the link direction has been considered where, with the exception of some symbols in some slots supporting predetermined transmissions such as for SS/PBCH blocks, symbols of a slot can have a flexible direction (UL or DL) that a UE can determine according to scheduling information for receptions or transmissions. A control channel can also be used to provide a DCI format, such as DCI format 2_0 in REF2 and REF3, that can indicate the link direction of some flexible symbols in one or more slots. Nevertheless, in actual deployments, it is difficult for a gNB scheduler to adapt the transmission direction of symbols without coordination with other gNB schedulers in the network. This is because of cross-link interference (CLI) where, for example, UL transmissions on a cell can experience large interference from DL transmissions on a neighboring cell from a gNB.

Certain commercial deployments apply UL/DL partitioning (UL-DL configuration) of symbols in a slot that is either fixed or varies only over relatively large time scales compared to time scales for a transmission from a UE or a reception by a UE. For example, an UL-DL configuration on a cell over a number of slots can be provided by a system information block and repeat in time with a periodicity of the number of slots. The symbols in all slots in a predetermined number of slots have a same direction (UL or DL) with the exception of some slots that include symbols with both directions together with some flexible or reserved symbols to provide a guard period for DL-to-UL switching. This avoids the CLI problem but maintains the problems of increased latency and reduced coverage. Those problems have increased in significance due to the introduction of services requiring low latency, such as for industrial IoT in factory automation, and as new spectrum is on higher frequency bands where pathloss is larger leading to coverage reduction compared to spectrum in lower frequency bands.

One approach to avoid both the CLI problem and the latency and coverage problems of TDD operation is to use carrier aggregation (CA), at least for cells in different frequency bands, or use a supplemental UL (SUL) carrier. For example, a UE can be configured with two cells where an UL/DL configuration for symbols over a number of slots on a first cell is different than an UL/DL configuration for symbols over the number of slots on a second cell. Then, when a transmission direction on the first cell in a DL one, a transmission direction on the second cell can be an UL one (and the reverse). This enables a network to use a same UL/DL configuration over a cell bandwidth while also providing more opportunities for a UE to transmit or receive, by utilizing either cell for transmission or reception at a given time such as a number of symbols or a slot, thereby mitigating the problem of increased latency or reduced coverage. A UE need not necessarily be capable for operation with CA as the UE is not required to simultaneously receive or transmit on more than one cell. A similar functionality can be provided for UL transmissions using a complementary UL/DL configuration of symbols on an UL carrier and on a SUL carrier.

A UE transmits a PUCCH on the primary cell and, when the UE is configured two carriers on the primary cell, on the UL carrier (not on the SUL carrier). To reduce a PUCCH transmission latency and improve data rates for TB receptions by the UE, the PUCCH transmission can be extended to occur on one or more secondary cells/carriers (SCells) such as ones using a different UL/DL configuration than the primary cell. Then, the UE can be provided PUCCH resources on all cells, or on both UL and SUL carriers as, in order to reduce latency or improve coverage, the PUCCH transmission can be on any of the cells/carriers.

A UE can also transmit a PUCCH with repetitions in order to improve a respective coverage. In order to avoid a material increase in latency or reduction in data rates due to HARQ process stalling, the repetitions can be on different cells/carriers depending on the availability of a PUCCH resource on each cell/carrier in order to reduce a latency require for the UE to transmit all repetitions.

Therefore, embodiments of the present disclosure take into consideration that there is a need to enable a PUCCH transmission on a cell/carrier from multiple cells/carriers depending on an availability of a PUCCH resource for the PUCCH transmission.

Embodiments of the present disclosure also take into consideration that there is a need to determine a PUCCH resource for PUCCH transmission on each cell from multiple cells/carriers where the UE can transmit a PUCCH.

Embodiments of the present disclosure further take into consideration that there is a need to enable a first repetition of a PUCCH or PUSCH to be transmitted on a first cell/carrier and a second repetition of the PUCCH or PUSCH to be transmitted on a second cell/carrier.

Additionally, embodiments of the present disclosure take into consideration that there is a need to determine a counting for a number of repetitions of a PUCCH transmission when the repetitions can be transmitted on cells using different SCS configurations.

The present disclosure relates to determining a cell for transmission of a PUCCH or of a PUSCH from a UE (such as the UE 116) to a base station (such as the BS 102).

The present disclosure also relates to enabling a PUCCH transmission on a cell/carrier from multiple cells/carriers depending on an availability of a PUCCH resource for the PUCCH transmission.

The present disclosure further relates to determining a PUCCH resource for PUCCH transmission on each cell from multiple cells/carriers where the UE can transmit a PUCCH.

Additionally, the present disclosure relates to enabling a first repetition of a PUCCH or PUSCH to be transmitted on a first cell/carrier and a second repetition of the PUCCH or PUSCH to be transmitted on a second cell/carrier.

The present disclosure also relates to determining a counting for a number of repetitions of a PUCCH transmission when the repetitions can be transmitted on cells using different SCS configurations.

For brevity, reference to HARQ-ACK information is associated with DCI formats scheduling PDSCH receptions. However, HARQ-ACK information can also be for reception of a SPS PDSCH release or for a DCI format reception that indicates dormant/non-dormant active DL BWPs in a group of cells without scheduling a PDSCH reception.

The term "higher layers" is used to denote control information that a UE is provided in a PDSCH reception, such as radio resource control (RRC) or a medium access control (MAC) control element (CE).

Embodiments of the present disclosure describe a framework for PUCCH transmission on a cell/carrier from multiple cells/carriers. This is described in the following examples and embodiments, such as those of FIGS. 8-10. That is, embodiments of the disclosure considers a framework for enabling a UE (such as the UE 116) to transmit a PUCCH on a cell/carrier from multiple cells/carriers. For brevity, unless explicitly mentioned otherwise, a PUCCH transmission is subsequently described with respect to multiple cells and the descriptions remain applicable in case of multiple carriers of a same cell. Also, although the descriptions of the embodiment are with respect to a PUCCH transmission, equivalent principles can apply for a PUSCH transmission. Further, the descriptions consider PUCCH or PUSCH transmission of one priority. When a UE is configured for PUCCH or PUSCH transmissions of multiple priorities, the descriptions are applicable per priority.

Figure 8:
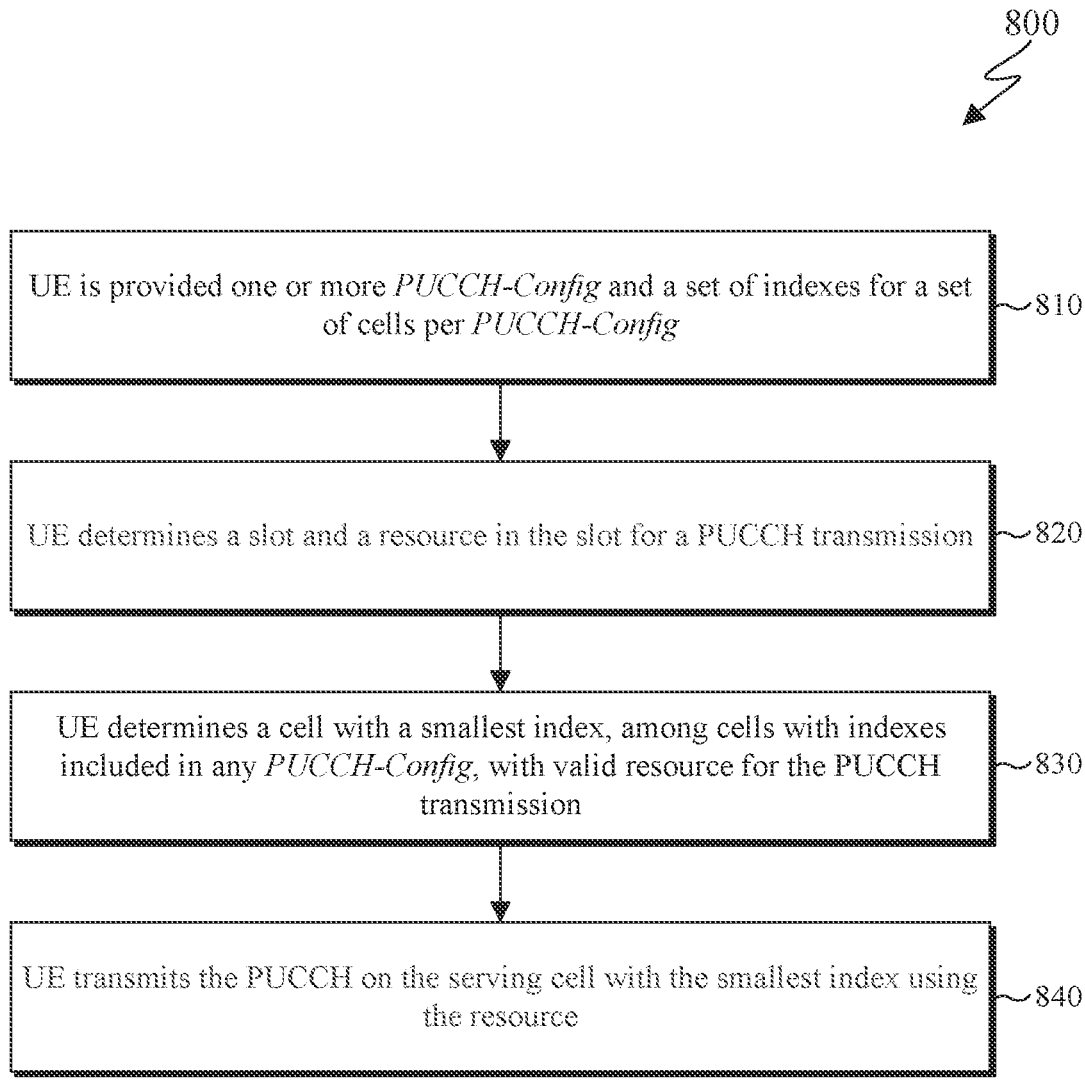
FIG. 8 illustrates an example method for determining a cell, from a set of multiple cells, for a physical uplink control channel (PUCCH) transmission according to embodiments of the present disclosure.
Figure 9:
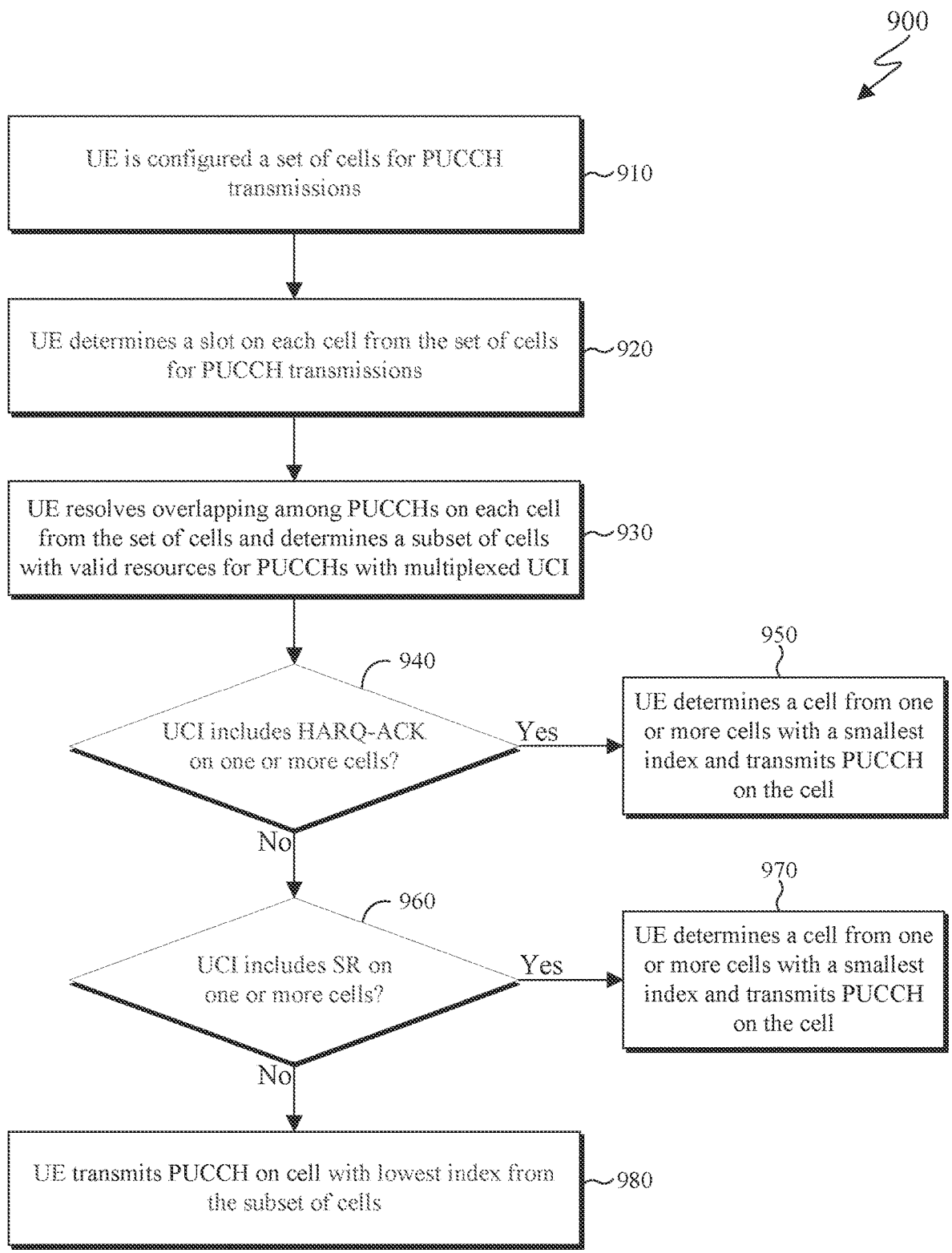
FIG. 9 illustrates an example method for determining a cell for a PUCCH transmission in a slot based on resolving overlapping among multiple PUCCH transmissions in the slot according to embodiments of the present disclosure.
Figure 10:
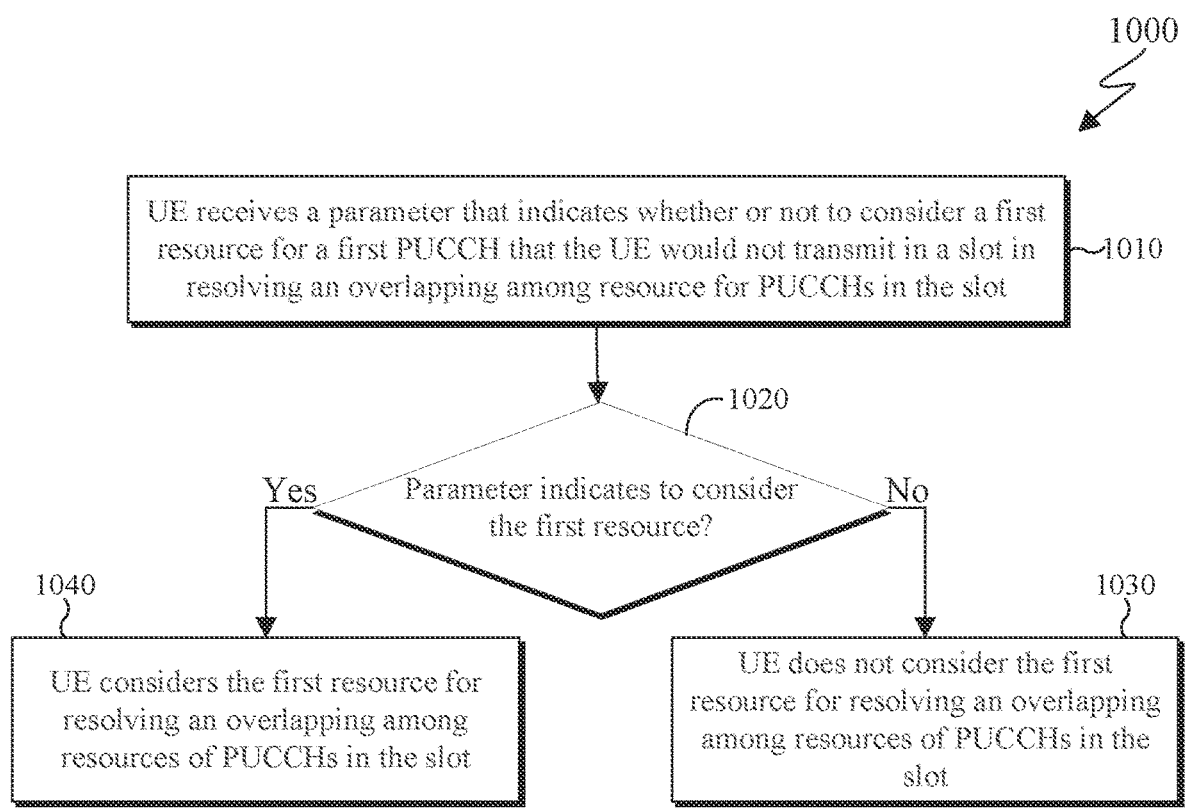
FIG. 10 illustrates an example method for determining a PUCCH resource for a PUCCH transmission according to embodiments of the present disclosure.

FIG. 8 illustrates an example method 800 for determining a cell, from a set of multiple cells, for a PUCCH transmission according to embodiments of the present disclosure. FIG. 9 illustrates an example method 900 for determining a cell for a PUCCH transmission in a slot based on resolving overlapping among multiple PUCCH transmissions in the slot according to embodiments of the present disclosure. FIG. 10 illustrates an example method 1000 for determining a PUCCH resource for a PUCCH transmission according to embodiments of the present disclosure.

The steps of the method 800 of FIG. 8, the method 900 of FIG. 9, and the method 1000 of FIG. 10 can be performed by any of the UEs 111-119 of FIG. 1, such as the UE 116 of FIG. 3. The methods 800, 900, and 1000 are for illustration only and other embodiments can be used without departing from the scope of the present disclosure.

In a first approach, a UE (such as the UE 116) is provided an information element PUCCH-Config, for example as described in REF5. The information element, PUCCH-Config, configures parameters for a PUCCH transmission and can additionally include a set of indexes for a corresponding set of serving cells where the UE can transmit PUCCH. The serving cells can include only serving cells where the UE is configured for UL transmissions in case of CA operation or, when the UE supports carrier switching, can include serving cells where the UE is configured to receive (DL cells) and is not configured to transmit (UL cells). The serving cells can be further restricted to cells that the UE indicates a capability for carrier switching for transmissions for a corresponding band combination. Alternatively, as is subsequently described, PUCCH-Config can be separately provided for the primary cell and for each secondary cell where the UE is configured to transmit PUCCH in a same cell group.

With the first approach, configuration parameters for a PUCCH transmission on each cell are identical. If an SCell can have a different SCS configuration than the primary cell then, for a PUCCH resource with $N_{PCell}^{PUCCH}$ symbols on the primary cell (PCel)l with SCS configuration $\mu_{PCell}$, a number of symbols for the PUCCH resource on the SCell with SCS configuration $\mu_{SCell}$ is described in Equation (1), below.

$$N_{SCell}^{PUCCH}=\min(N_{sym}^{slot},\max(1, N_{PCell}^{PUCCH} \cdot 2^{\mu_{SCell}-\mu_{PCell}})) \quad (1)$$

In Equation (1), $N_{sym}^{slot}$ is a number of symbols per slot such as 14. A same first symbol can also apply for a PUCCH resource on the primary cell and a corresponding PUCCH resource on the SCell.

In a second approach, the first approach is enhanced for PUCCH-Config to provide multiple information elements PUCCH-SpatialRelationlnfo in order to enable a UE to transmit PUCCH on cells having different quasi-collocation properties, as described in REF3 and REF5. Use of multiple information elements PUCCH-SpatialRelationlnfo can also enable use of different power control parameters for a PUCCH transmission in order to account for SCS configurations per cell, resulting to different durations of symbols and consequently for different durations of a PUCCH transmission, or account for different cell sizes requiring a different PUCCH transmission power. More than one cell from the number of serving cells can have a same PUCCH-SpatialRelationInfo and corresponding indexes can be provided together with each PUCCH-SpatialRelationInfo.

In a third approach, a UE is provided multiple information elements PUCCH-Config, wherein a serving cell index is included only in one or none of the multiple PUCCH-Config. The third approach is most flexible in enabling PUCCH transmission from a UE on a cell from more than one cells, including cells where PUCCH transmissions use different SCS configurations, while requiring additional higher layer signaling for the additional PUCCH-Config. For example, PUCCH resources per PUCCH resource set are independently configured for different serving cells. For example, an SCell with different SCS configuration than the PCell can be flexibly supported for PUCCH transmissions.

The method 800 as illustrated in FIG. 6 describes a procedure for a UE to determine a cell, from a set of multiple cells, for a PUCCH transmission according to this disclosure.

In step 810, a UE (such as the UE 116) is provided one or more PUCCH-Config information elements wherein each PUCCH-Config includes configurations of parameters for a PUCCH transmission and can include a set of one or more indexes for a corresponding set of serving cells. A serving cell that a UE is configured for receptions or for transmissions is included either only in one or in none PUCCH-Config.

With reference to slots of PUCCH transmissions on a primary cell, in step 820, the UE determines a slot and a PUCCH resource in the slot for a PUCCH transmission. The determination of a PUCCH resource can be for any serving cell from the set of serving cells in each corresponding PUCCH-Config.

In step 830, the UE determines a serving cell with a smallest index, among the serving cells with indexes included in any PUCCH-Config, that has a valid PUCCH resource for the PUCCH transmission. A valid PUCCH resource does not include any symbols or RBs where the UE cannot transmit the PUCCH.

In step 840, the UE transmits the PUCCH on the serving cell with the smallest index using the corresponding PUCCH resource.

In certain embodiments, it is possible that, instead of the UE determining a PUCCH resource for any serving cell from each set of serving cells in each corresponding PUCCH-Config, the UE first determines whether a PUCCH resource on a serving cell with the smallest index that is included in a PUCCH-Config, such as the primary cell, is valid and, when not valid, the UE progressively continues with determining whether a PUCCH resource on a serving cell with a next larger index that is included in a PUCCH-Config is valid until the UE determines a serving cell with a valid PUCCH resource for the PUCCH transmission. If there is no serving cell with a valid PUCCH resource in the slot, the UE can either drop the PUCCH transmission or postpone the PUCCH transmission to a later slot.

When a UE (such as the UE 116) would transmit multiple overlapping PUCCHs in a slot or overlapping PUCCH(s) and PUSCH(s) in a slot on a cell, such as a primary cell, and the UE is configured to multiplex different UCI types in one PUCCH, and at least one of the multiple overlapping PUCCHs or PUSCHs is in response to a DCI format detection by the UE, the UE multiplexes all corresponding UCI types according to several timeline conditions depending on the UCI types or depending on whether the multiplexing in on a PUCCH or a PUSCH, as described in REF3. When one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies a set of timeline conditions described in REF3.

For example, assuming for simplicity that there is no PUSCH in the group of overlapping PUCCHs and PUSCHs, $S_0$ is not before a symbol with CP starting after $T_{proc,2}^{mux}$ where $T_{proc,2}^{mux}$ is a maximum of $\{T_{proc,2}^{mux,1}, \ldots, T_{proc,2}^{mux,i}, \ldots\}$. In this example, for the i-th PDSCH or PDCCH with associated HARQ-ACK information on a PUCCH, is described in Equation (2).

$$T_{proc,2}^{mux,i} = (N_2+1) \cdot (2048+144) \cdot \kappa \cdot 2^{-\mu} \cdot T_C \quad (2)$$

Here, $N_2$ is a PUSCH preparation time in number of symbols, as described in REF4, and is selected based on the UE PUSCH processing capability on the primary cell, when configured; otherwise, $N_2$ is selected based on the UE PUSCH processing capability 1. Additionally, $\mu$ is selected based on the smallest SCS configuration between the SCS configuration for PDCCHs associated with the HARQ-ACK information on the PUCCH and the SCS configuration for the PUCCH transmission on the primary cell. As shown in Equation (2), $K=64$ and $T_C=1/(\Delta f_{max} \cdot N_f)$ where $f_{max}=480 \cdot 10^3$ Hz and $N_f=4096$ as defined in REF1.

For a PUCCH transmission on a cell from multiple cells, a value of $T_{proc,2}^{mux}$ can depend on the cell. This is because the value of $\mu$ depends on the SCS configuration for PUCCH transmission on the cell and because the value of $N_2$ depends on the UE processing capability on the cell. With reference to a slot of PUCCH transmission on the primary cell, the UE can expect that the first symbol $S_0$ of the earliest PUCCH among a group overlapping PUCCHs in the slot satisfies a set of timeline conditions described in REF3 for the primary cell. However, the set of timeline conditions may not be satisfied for a PUCCH transmission on a cell from a set of cells configured for PUCCH transmission. Then, although a set of timeline conditions can be same on all cells where the UE can transmit a PUCCH, and different subsets from the set of timeline conditions can be applicable for different cells, a selection of a cell needs to not only depend on an availability of a valid PUCCH resource for the PUCCH transmission on the cell but also on satisfying all applicable timeline conditions for multiplexing UCI, such as HARQ-ACK information, in the PUCCH transmission on the cell. Further, in order to account for additional processing time required by the UE to determine a PUCCH resource for PUCCH transmission on multiple cells, an additional value of $T_{add}^{mcell}$ can be added to $T_{proc,2}^{mux,i}$ or to $T_{proc,2}^{mux}$.

In certain embodiments, when a UE (such as the UE 116) needs to perform carrier/cell switching in order to transmit PUCCH on an SCell instead of the primary cell, an additional switching time $T_{switch}$ needs to be added to $T_{proc,2}^{mux,i}$, or to $T_{proc,2}^{mux}$, and then $T_{proc,2}^{mux}$ is described in Equation (3).

$$T_{proc,2}^{mux} = (N_2+1) \cdot (2048+144) \cdot \kappa \cdot 2^{-\mu} \cdot T_C + T_{switch} \quad (3)$$

Here, the value of $T_{switch}$ can be indicated by the UE as a capability parameter.

The UE may drop transmissions during the switching time $T_{switch}$. The UE may not expect to perform more than one switching between cells for transmissions in a slot with $\mu_{UL} = \max(\mu_{UL,1}, \mu_{U2,2})$, wherein $\mu_{UL,1}$ is a SCS configuration for uplink transmissions on the cell prior to switching and $\mu_{UL,2}$ is a SCS configuration for uplink transmissions on the cell after the switching. For example, a UE needs to perform carrier/cell switching between cells when the UE does not have a capability for simultaneous transmissions on the cells. Similar, when the primary cell is in a first timing advance group (TAG) and a potential SCell for PUCCH transmission is in a second TAG, a TA different $T_{TA}$ can be added to $T_{proc,2}^{mux,i}$ or to $T_{proc,2}^{mux}$. It is also possible to restrict the SCells for PUCCH transmission to be in a same TAG as the primary cell.

When a UE (such as the UE 116) would transmit multiple overlapping PUCCHs on the primary cell with UCI that the UE in configured or specified in the system operation to multiplex in a same PUCCH, and applicable timeline conditions are satisfied for multiplexing UCI among the overlapping PUCCHs in a single PUCCH, the UE resolves the overlapping and determines a new PUCCH resource for a PUCCH transmission with the multiplexed UCI as described in REF3. Valid PUCCH resources for PUCCH transmissions on different cells can be different depending on whether corresponding timeline conditions are satisfied and depending on whether the PUCCH resources are prior or after resolving overlapping of the multiple PUCCHs. Further, valid PUCCH resources can be different for different PUCCH transmissions, for example because different cells can operate with different UL-DL configurations.

For example, on a first cell a PUCCH resource for a PUCCH transmission with HARQ-ACK information can be valid and a PUCCH resource for a PUCCH transmission with CSI can be invalid while the reverse can apply on a second cell. Therefore, a procedure for determining a PUCCH resource for PUCCH transmission on each cell, from the set of cells where the UE can transmit a PUCCH, needs to be defined.

In a first approach, the UE resolves an overlapping, when any, among PUCCH resources for PUCCH transmissions in a slot for each cell where the UE is configured to transmit PUCCH, for example in a same manner as when the cell is the primary cell. When the UE determines a valid PUCCH resource for multiple cells, the UE transmits the PUCCH in a cell from the multiple cells with a smallest index.

The PUCCH resource can be additionally determined after an overlapping, when any, with invalid symbols such as DL symbols according to an UL-DL configuration provided by higher layers or symbols corresponding to transmissions of SS/PBCH blocks, is resolved. For example, when after resolving overlapping among multiple PUCCHs in a slot, the UE determines a first PUCCH resource for a PUCCH transmission on the primary cell and a second PUCCH resource for a PUCCH transmission on an SCell, the UE transmits the PUCCH on the SCell and does not transmit the PUCCH on the primary cell when a symbol of the first PUCCH resource is determined to be a DL symbol or a symbol used for SS/PBCH transmission and the like.

In a second approach, prior to resolving an overlapping, when any, among PUCCH resources for PUCCH transmissions in a slot on the primary cell, the UE determines whether a PUCCH resource on the primary cell corresponding to HARQ-ACK multiplexing in a PUCCH is valid. When the PUCCH resource is valid, the UE proceeds with resolving the overlapping. Alternatively, when the PUCCH resource is invalid, the UE considers whether a PUCCH resource on an SCell with a smallest index corresponding to HARQ-ACK multiplexing is valid. When the PUCCH resource for HARQ-ACK multiplexing is valid, the UE proceeds with resolving the overlapping among PUCCH resources, when any, on the SCell; otherwise, the process continues for an SCell with a next larger index until the UE determines a valid PUCCH resource for a PUCCH transmission with HARQ-ACK information. When no such PUCCH resource exists on any cell, the process continues on the primary cell for resolving overlapping, when any, of PUCCH resources corresponding to PUCCH transmissions with UCI types other than HARQ-ACK information. The second approach can be combined with the first approach so that the UE transmits a PUCCH on a second cell when, after resolving any overlapping of PUCCH resources on a first cell with a smaller index, a resulting PUCCH resource is invalid, such as when it includes a DL symbol. The UE selects a cell with a smallest index where a PUCCH resource for a PUCCH transmission with HARQ-ACK information is valid. If the UCI types do not include HARQ-ACK information, a same approach can apply for SR.

In a third approach, a PUCCH transmission on an SCell is considered only for multiplexing HARQ-ACK information. When a PUCCH resource for PUCCH transmission with HARQ-ACK information on the primary cell is not valid, the UE determines an SCell with a smallest index where the UE has a valid PUCCH resource for a PUCCH transmission with HARQ-ACK information, the UE transmits the PUCCH on the SCell, and the UE does not transmit a PUCCH on any other cell of a same cell group.

As an alternative to the above three approaches, for transmission by a UE of a PUCCH with HARQ-ACK information that is associated with a DCI format, the DCI format can include a field with a value indicating a cell, among a set of cells configured for PUCCH transmission by the UE, for the PUCCH transmission. Then, a selection among possible approaches can be left to a gNB implementation without the UE having to perform a procedure for determining a cell for the PUCCH transmission. For UCI types other than HARQ-ACK, the UE can be configured by higher layers or be specified in the system operation whether to multiplex the UCI types with the HARQ-ACK in a PUCCH transmission in a slot of the cell when it is not the primary cell.

The method 900 as illustrated in FIG. 9 describes a procedure for a UE configured to transmit PUCCH on multiple cells to determine a cell for a PUCCH transmission in a slot based on resolving overlapping among multiple PUCCH transmissions in the slot according to this disclosure.

In step 910, a UE (such as the UE 116) is configured a set of cells for PUCCH transmissions. In step 920, the UE determines a slot on each cell from the set of cells for PUCCH transmissions. The determination is with respect to slots for PUCCH transmissions and can be based, for example, on a PDSCH-to-HARQ_feedback timing indicator field value in a DCI format associated with a PUCCH transmission with HARQ-ACK information or based on configurations by higher layers for a PUCCH transmission that is not associated with a DCI format. For example, a same SCS configuration as for the primary cell can be used for PUCCH transmission in any cell.

In step 930, the UE resolves an overlapping, when any, among PUCCH transmissions on each cell from the set of cells and determines a subset of cells with corresponding valid PUCCH resources for PUCCH transmissions with multiplexed UCI.

In step 940, the UE determines whether or not the multiplexed UCI includes HARQ-ACK information for PUCCH transmission on one or more cells from the subset of cells. When the multiplexed UCI includes HARQ-ACK information for PUCCH transmission on one or more cells from the subset of cells (as determined in step 940), the UE in step 950 determines a cell from the one or more cells with a smallest index and transmits the PUCCH on the cell. Alternatively, the UE in step 960, determines whether or not the multiplexed UCI includes SR information for PUCCH transmission on one or more cells from the subset of cells. When the multiplexed UCI includes SR information for PUCCH transmission on one or more cells from the subset of cells (as determined in step 960), the UE in step 970 determines a cell from the one or more cells with a smallest index and transmits the PUCCH on the cell. Alternatively, in step 980, the UE transmits the PUCCH on a cell with a smallest index from the subset of cells.

When the cells do not have a same SCS configuration, a slot for PUCCH transmissions on the primary cell can overlap with multiple slots for PUCCH transmissions on an SCell, or the reverse. When a slot for PUCCH transmissions on the primary cell overlaps with multiple slots for PUCCH transmissions on an SCell, several approaches for determining a slot for a PUCCH transmission on the SCell can be considered. In a first approach, the slot for a PUCCH transmission on the SCell is an earliest slot where a valid PUCCH resource for PUCCH transmission exists. In a second approach, the slot for a PUCCH transmission on the SCell is a slot that overlaps with a first symbol of a PUCCH resource (valid or invalid) for a PUCCH transmission on the primary cell. In a third approach, the slot on the SCell can be configured by higher layers or be determined in the specifications of the system operation, such as a last slot from the multiple slots.

When a slot for a PUCCH transmission on an SCell overlaps with multiple slots for PUCCH transmissions on the primary cell, several approaches for determining a PUCCH resource for a PUCCH transmission on the SCell can be considered. In a first approach, any PUCCH resource for a PUCCH transmission on the SCell can be selected subject to timeline conditions being satisfied. In a second approach, only PUCCH resources with a first symbol that does not start prior to the first symbol of the slot on the primary cell can be selected for PUCCH transmission.

When a UE (such as the UE 116) transmits a PUCCH with HARQ-ACK information having only ACK values or having only NACK values, the UE can be configured to skip the PUCCH transmission. For example, a serving gNB (such as the BS 102) can configure a UE to not transmit a PUCCH with HARQ-ACK information that is only in response to SPS PDSCH receptions when a block error rate (BLER) target for associated TBs is small, because a corresponding HARQ-ACK information is highly likely to have only ACK values. Even when a serving gNB transmits a DCI format that is associated with a PUCCH transmission from a UE with HARQ-ACK information and the UE misses the DCI format, the gNB can still infer the reception outcomes at the UE when the gNB does not receive a PUCCH with HARQ-ACK information from the UE. For example, when a UE is configured multiple SPS PDSCH configurations that the UE provides associated HARQ-ACK information in a PUCCH, the gNB may not transmit PDSCHs for all the multiple SPS PDSCH configurations that the UE provides associated HARQ-ACK information in a same PUCCH, the UE cannot typically determine an absent SPS PDSCH reception, and the gNB can configure the UE to not transmit a PUCCH with HARQ-ACK information having only NACK values.

When a first PUCCH resource for a first PUCCH with HARQ-ACK information that a UE would not transmit overlaps with PUCCH resources for other PUCCH transmissions in a slot and, after resolving overlapping, the UE determines a second PUCCH resource for a second PUCCH with the multiplexed UCI from some or all of the overlapped PUCCHs. Here, the second PUCCH resource can depend on whether the UE considers the first PUCCH resource as one of the overlapping PUCCH resources. For example, when the HARQ-ACK information does not have only ACK values or does not have only NACK values, the UE would transmit the first PUCCH using the first PUCCH resource; otherwise, the UE would not transmit the first PUCCH. If the UE does not consider the first PUCCH resource as one of the overlapping PUCCH resources when the UE would not transmit the first PUCCH then, because a serving gNB does not know the values of the HARQ-ACK information, the serving gNB needs to receive the second PUCCH under two assumptions for the second PUCCH resource. The first assumption corresponds to the case that the UE considered the first PUCCH resource for resolving overlapping (values of the HARQ-ACK information bits are not only ACK or only NACK). The second assumption corresponds to the case that the UE did not consider the first PUCCH resource for resolving overlapping.

In a first approach, even though the UE would not transmit the first PUCCH, the system operation can specify that the UE behaviour is to consider the first PUCCH resource as one of the overlapping PUCCH resources and the UE multiplexes the HARQ-ACK information in the second PUCCH that is transmitted using the second PUCCH resource, regardless of the values of the HARQ-ACK information.

In a second approach, the serving gNB can configure the UE whether to consider the first PUCCH resource for resolving overlapping when the UE would not transmit the first PUCCH. When the UE is configured to not consider the first PUCCH resource for resolving overlapping and the UE would not transmit the first PUCCH, the serving gNB can determine the PUCCH resource of the PUCCH reception by detecting a discontinuous transmission (DTX) from the UE in one of the two possible PUCCH resources for the second PUCCH resource or by detecting a signal presence in the other of the two possible PUCCH resources for the second PUCCH resource.

The method 1000 as illustrated in FIG. 10 describes a procedure for a UE to determine a PUCCH resource for a PUCCH transmission after resolving overlapping among multiple PUCCH resources for PUCCH transmissions that include a PUCCH with HARQ-ACK information that the UE would transmit or would not transmit depending on the HARQ-ACK information values.

In step 1010, a UE (such as the UE 116) receives a parameter by higher layers from a serving gNB that indicates whether or not the UE considers a first PUCCH resource for a first PUCCH that the UE would not transmit in a slot in determining a second PUCCH resource for a second PUCCH that includes UCI from multiple PUCCHs with overlapped PUCCH resources in the slot. In step 1020, the UE determines whether or not the parameter indicates to consider the first PUCCH resource for the first PUCCH that the UE would not transmit for resolving overlapping of PUCCH resources.

When the configuration indicates for the UE to not consider the first PUCCH resource (as determined in step 1020), the UE in step 1030 does not consider the first PUCCH resource for resolving an overlapping, when any, among PUCCH resources of PUCCHs in the slot for determining the second PUCCH resource. Here the UE does not multiplex the UCI from the first PUCCH in the second PUCCH.

Alternatively, when the configuration indicates for the UE to consider the first PUCCH resource (as determined in step 1020), the UE in step 1040 resolves an overlapping, when any, among PUCCH resources of PUCCHs in the slot that include the first PUCCH resource of the first PUCCH for determining the second PUCCH resource and the UE multiplexes the UCI from the first PUCCH in the second PUCCH.

Although FIG. 8 illustrates the method 800, the FIG. 9 illustrates the method 900, and the FIG. 10 illustrates the method 1000 various changes may be made to FIGS. 8-10. For example, while the method 800, the method 900, and the method 1000 are shown as a series of steps, various steps could overlap, occur in parallel, occur in a different order, or occur multiple times. In another example, steps may be omitted or replaced by other steps. For example, steps of the method 800, the method 900, and the method 1000 can be executed in a different order.

Embodiments of the present disclosure describe PUCCH transmissions on more than one cells/carriers of a cell group. This is described in the following examples and embodiments, such as those of FIGS. 11-13. That is, embodiments of the disclosure considers a procedure to support repetitions of (i) a PUCCH transmission, (ii) a PUSCH transmission on multiple cells, (iii) multiple carriers of a cell, (iv) their combination, or the like. For brevity, the descriptions are with respect to multiple cells and are directly applicable to multiple carriers of a cell or to a combination of multiple cells and multiple carriers.

Figure 11:
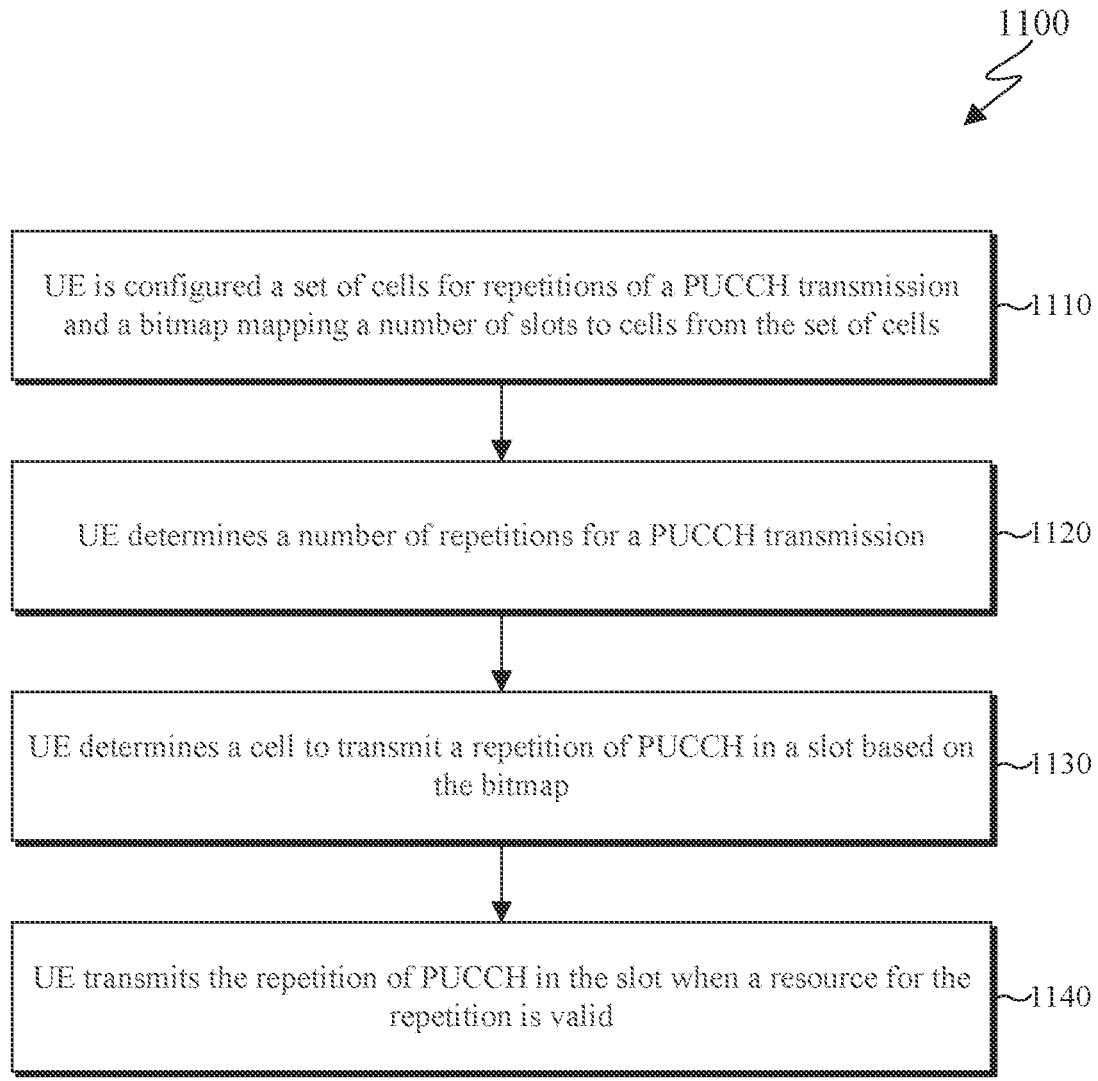
FIGS. 11 and 12 illustrate example methods for determining a cell for a repetition of a PUCCH transmission according to embodiments of the present disclosure.
Figure 12:
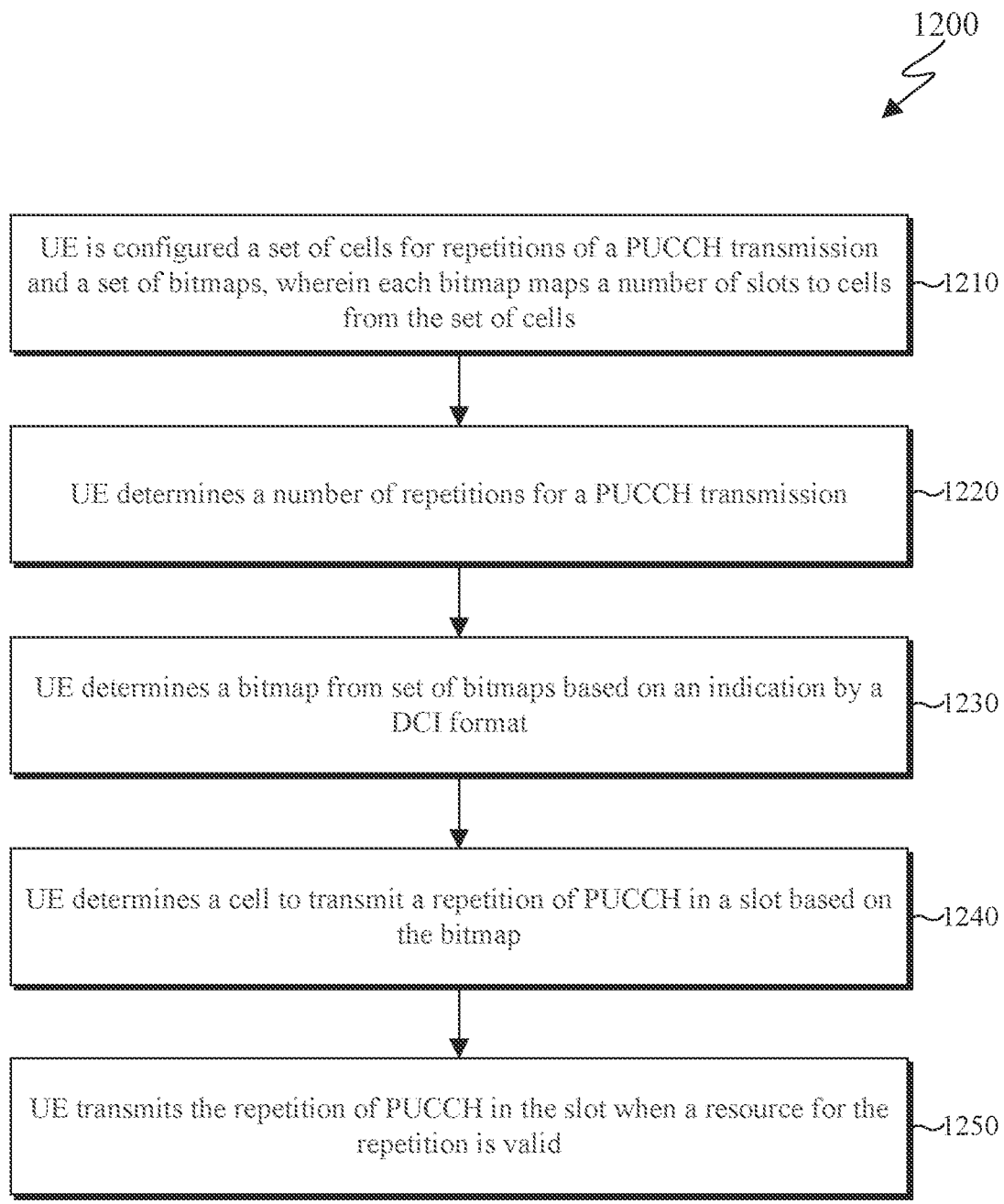
Figure 13:
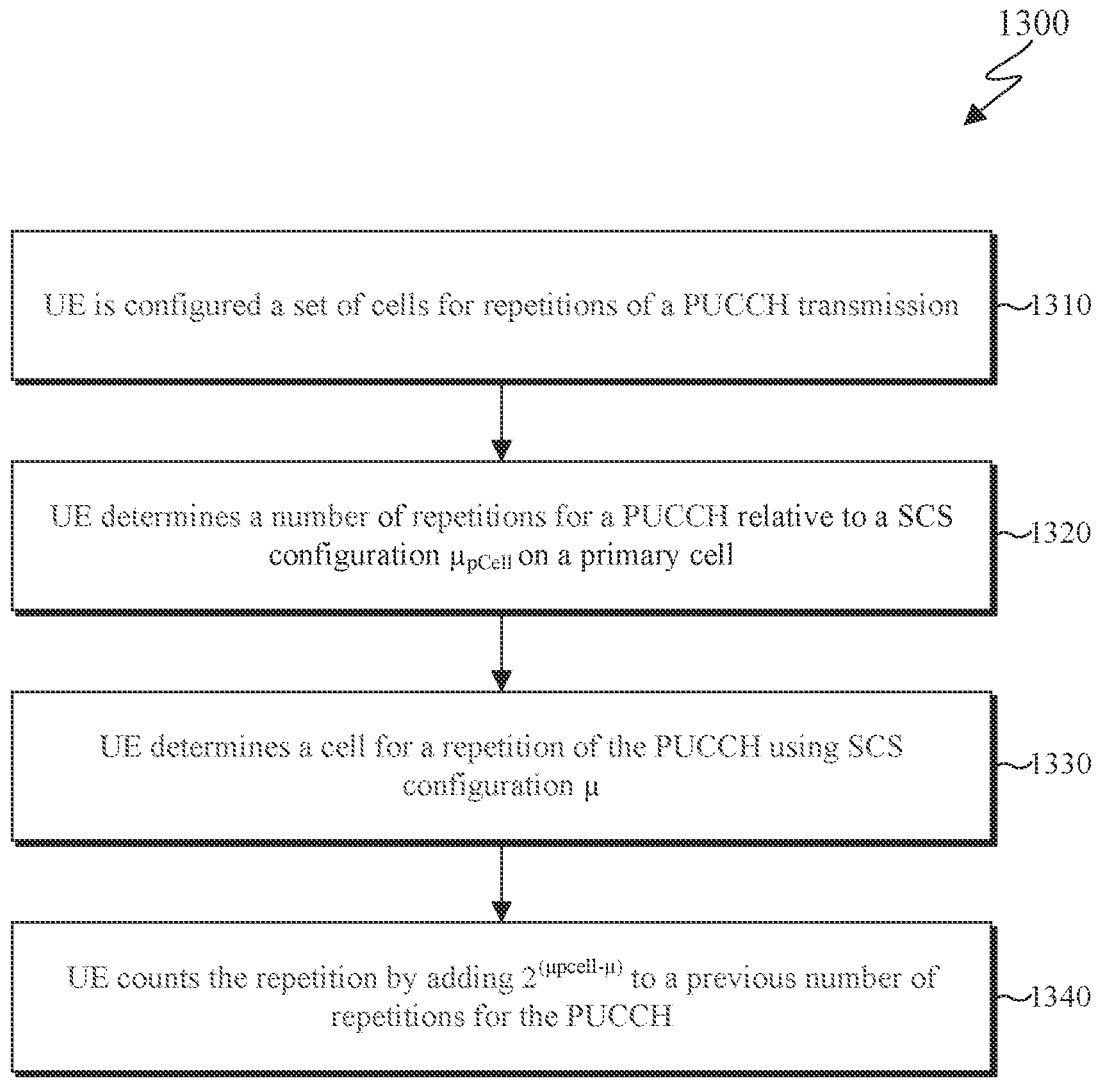
FIG. 13 illustrates an example method for determining a number of repetitions for a PUCCH transmission according to embodiments of the present disclosure.

FIGS. 11 and 12 illustrate example methods 1100 and 1200 for determining a cell for a repetition of a PUCCH transmission according to embodiments of the present disclosure. FIG. 13 illustrates an example method 1300 for determining a number of repetitions for a PUCCH transmission according to embodiments of the present disclosure.

The steps of the method 1100 of FIG. 11, the method 1200 of FIG. 12, and the method 1300 of FIG. 13 can be performed by any of the UEs 111-119 of FIG. 1, such as the UE 116 of FIG. 3. The methods 1100, 1000, and 1300 are for illustration only and other embodiments can be used without departing from the scope of the present disclosure.

In certain embodiments, a UE (such as the UE 116) determines a PUCCH resource set based on the UCI payload in a PUCCH transmission as described in REF3. A UE subsequently determines a PUCCH resource from the PUCCH resource set for the PUCCH transmission.

In a first approach, PUCCH resource indexes in corresponding PUCCH-Config can have a one-to-one mapping in corresponding PUCCH resource sets and the UE uses a same PUCCH resource index on all cells where the UE transmits the PUCCH.

In a second approach, when the PUCCH transmission is associated with a DCI format, the DCI format can indicate a PUCCH resource for the PUCCH transmission on each cell from the set of cells where the UE transmits the PUCCH. When the PUCCH transmission is configured by higher layers, the configuration can include a PUCCH resource on each cell from the set of cells where the UE transmits the PUCCH or the configuration of the PUCCH transmission can be separate per cell.

In a third approach, the UE determines a PUCCH resource on a first cell, such as the primary cell, based on an indication by a DCI format or based on a configuration by higher layers and determines a PUCCH resource on a second cell, such as an SCell, to be a first PUCCH resource, in an associated PUCCH resource set that the UE determines based on the UCI payload in the PUCCH transmission, that results to a smaller UCI encoding rate than a configured code rate.

For a PUSCH transmission with repetitions and for a set of cells where a UE can transmit repetitions of the PUSCH and the UE has active UL BWPs with a same number of RBs, the UE can transmit a repetition of the PUCCH on any cell from the set of cells in a same manner as when the UE transmits all repetitions of the PUSCH on one cell from the set of cells. For example, the UE can transmit a first repetition on a first cell and a second repetition on a second cell using RBs with same indexes in the active UL BWP and symbols with same indexes in a slot on both cells. When the PUSCH transmission is with Type-B repetitions, the nominal repetitions are defined on any cell in a same manner as for a same cell from the set of cells. The UE can be provided a separate PUSCH-Config per sub-sets of cells from the set of cells, wherein a sub-set includes one or more cells.

When a UE transmits repetitions of a PUCCH with a UCI payload that is larger than 11 bits and is encoded using a polar code, a same number of resource elements with UCI symbols needs to be used for each repetition in order for a gNB to properly to combine the receptions from the repetitions prior to UCI decoding. Certain repetitions achieve that constraint by requiring that a first symbol for each repetition is same in each slot and each repetition is over a same number of consecutive symbols. The two conditions result to a constraint that same symbols are used in each slot with a repetition of a PUCCH transmission. Relaxing the same symbols per slot constraint while maintaining an ability for the gNB to combine UCI symbols from received repetitions can reduce a latency by increasing a number of valid slots for repetitions of a PUCCH transmission.

A first approach is to require that a same number of consecutive symbols is used in each slot with a repetition of a PUCCH transmission without requiring that the symbols are the same symbols, thereby enabling different first and last symbols for repetitions in different slots.

A second approach is to allow a first number of symbols and a first number of RBs to be used in a first slot and a second number of symbols and a second number of RBs to be used in a second slot so that a total number or REs used for UCI symbols is same in the first and second slots. For example, if $N_{symbol}$ symbols and $M_{RB}$ RBs are used for a repetition in a first slot, $2 \cdot N_{symbol}$ symbols and $M_{RB}/2$ RBs are used in a second slot, wherein the ratio of DM-RS REs over a total number of REs for the repetitions is same in both slots, for example, the PUCCH format structure over the $N_{symbol}$ symbols in the first slot is repeated over an additional $N_{symbol}$ symbols in the second slot.

Regarding the description above with reference to FIGS. 8-10, a serving gNB (such as the BS 102) can provide to a UE a first number of PUCCH-Config information elements for a PUCCH transmission on a second number of serving cells, or a third number of PUSCH-Config information elements for a PUSCH transmission on a fourth number of serving cells. The first number is smaller than or equal to the second number and the third number is smaller than or equal to the fourth number. When the first number is equal to the second number, there is a one-to-one correspondence among the first number of PUCCH-Config information elements and the second number of serving cells. When the third number is equal to the fourth number, there is a one-to-one correspondence among the third number of PUSCH-Config information elements and the fourth number of serving cells. When the first number is smaller than the second number, more than one serving cells from the second number of serving cells are associated with one PUCCH-Config from the first number of PUCCH-Config, wherein a serving cell is associated with only one PUCCH-Config. When the third number is smaller than the fourth number, more than one serving cells from the fourth number of serving cells are associated with one PUSCH-Config from the first number of PUSCH-Config, wherein a serving cell is associated with only one PUSCH-Config.

In a first approach for supporting repetitions of a PUCCH transmission on multiple serving cells, according to a corresponding PUCCH-Config per serving cell, the UE is provided a mapping between a number of slots on the primary cell, such as 10 slots or 40 slots, and cells from a set of cells. Denoting by $N_{switch}^{cells}$ a number of cells in the set of cells and by $N_{switch}^{slots}$ the number of slots, the mapping can be provided by a bitmap, wherein each element of the bitmap includes $\log_2(N_{switch}^{cells})$ bits and the number of elements of the bitmap is $N_{switch}^{slots}$. For example, for $N_{switch}^{cells}=2$ cells and $N_{switch}^{slots}=10$ slots, a bitmap of {1, 1, 1, 1, 0, 0, 0, 0, 0, 0} indicates use of a second cell for PUCCH transmissions in the first four slots and use of a first cell for PUCCH transmissions in the last six slots per period of 10 slots. It is not necessary that all slots can be used for PUCCH transmissions. For example, the first and second slots or the fifth and sixth slots may not include any valid PUCCH resource for a PUCCH transmission. The first approach can be supported in a same manner for a PUSCH transmission.

When a PUCCH transmission from a UE (such as the UE 116) is associated with a DCI format (such as when the PUCCH transmission provides HARQ-ACK information associated with the DCI format), the UE can determine a cell for the PUCCH transmission based on a PDSCH-to-HARQ_feedback timing indicator field value in the DCI format indicating a slot for the PUCCH transmission and on the bitmap providing a mapping among slots over a period of slots and cells from a set of cells. When parameters of the PUCCH transmission are configured by higher layers, the UE can determine a slot for the PUCCH transmission based on the parameters, such as a period in slots and a starting slot and determine a cell for the PUCCH transmission based on the bitmap.

When a PUCCH transmission from a UE is with a number of $N_{PUCCH}^{repeat}>1$ repetitions, the UE can determine a cell for the first repetition as described for a PUCCH transmission without repetitions and can determine subsequent repetitions in successive slots according to the bitmap. The number of $N_{PUCCH}^{repeat}$ repetitions can be provided to the UE by higher layers or, when the PUCCH transmission is associated with a DCI format, by a field in the DCI format. For example, the DCI format can include a separate field indicating $N_{PUCCH}^{repeat}$ repetitions or a number of repetitions can be included in a PUCCH resource for a PUCCH transmission that is indicated by a PUCCH resource indicator field in the DCI format. When a PUCCH transmission is with repetitions, a multiplexing of the UCI provided by the PUCCH transmission with other UCI from overlapping PUCCH transmissions can be disabled and the UE can prioritize one of the PUCCH transmissions as described in REF3.

The method 1100 as illustrated in FIG. 11 describes a first procedure for a UE to determine a cell for a repetition of a PUCCH transmission according to embodiments of this disclosure.

In step 1110, a UE (such as the UE 116) is provided by higher layers a set of cells, such as two cells, for repetitions of a PUCCH transmission and a bitmap providing a mapping for a number of slots to cells from the set of cells, wherein the mapping repeats with a period equal to the number of slots on the primary cell. In step 1120, the UE determines a number of repetitions for a PUCCH transmission, for example based on an indication by a DCI format associated with the PUCCH transmission or based on parameters provided by higher layers that configure the PUCCH transmission. Based on the bitmap, the UE in step 1130 determines a cell to transmit a repetition of the PUCCH in a slot. In step 1140, the UE transmits the repetition the repetition of the PUCCH in the slot when a PUCCH resource on the cell for the repetition of the PUCCH transmission is valid.

In a second approach for supporting repetitions of a PUCCH transmission on multiple serving cells, according to a corresponding PUCCH-Config per serving cell, a UE (such as the UE 116) is provided a set of mappings between a first number of slots on the primary cell, such as 10 slots or 40 slots, and cells from a set of cells. When the PUCCH transmission is associated with a DCI format, the DCI format can indicate a mapping from the set of mappings for the UE to use in determining slots to transmit repetitions of the PUCCH. The second approach can be beneficial when UL-DL configurations for some cells from the set of cells are adapted per a second number of slots based on a DCI format instead of typically remaining same per the second number of slots based on higher layer signaling. The first number of slots can be same as or smaller than the second number of slots. With the second approach and for a PUCCH transmission associated with a DCI format, a serving gNB can indicate a mapping between the first and number of slots on the primary cell and cells from the set of cells that is appropriate to the UL-DL configurations used in cells from the set of cells, thereby increasing a number of valid PUCCH resources across cells for the UE to transmit repetitions of the PUCCH over a third number of slots. The second approach can be supported in a same manner for a PUSCH transmission with repetitions wherein, for example, a number of repetitions can be included in an entry of a configured time domain resource allocation (TDRA) table or can be indicated by a separate field in the DCI format or, for a CG-PUSCH transmission, can be provided by higher layers as part of the configuration of the CG-PUSCH transmission.

The method 1200 as illustrated in FIG. 12 describes a second procedure for a UE to determine a cell for a repetition of a PUCCH transmission according to embodiments of this disclosure.

In step 1210, a UE (such as the UE 116) is provided by higher layers a set of cells for repetitions of a PUCCH transmission and a set of bitmaps, wherein each bitmap from the set of bitmaps provides a periodic mapping for a number of slots on the primary cell to cells from the set of cells. In step 1220, the UE determines a number of repetitions for a PUCCH transmission, for example based on an indication by a DCI format associated with the PUCCH transmission or based on parameters provided by higher layers that configure the PUCCH transmission. in step 1230, the UE determines a bitmap from the set of bitmaps based on an indication by a DCI format. Based on the bitmap, the UE in step 1240, determines a cell to transmit a repetition of the PUCCH in a slot. In step 1250, the UE transmits the repetition the repetition of the PUCCH in the slot when a PUCCH resource on the cell for the repetition of the PUCCH transmission is valid.

In a third approach for supporting repetitions of a PUCCH transmission on multiple serving cells, according to a corresponding PUCCH-Config per serving cell, a UE (such as the UE 116) can determine a cell, from the multiple serving cells, with a lowest index that has a valid PUCCH resource for a repetition of the PUCCH transmission and transmit the repetition of the PUCCH on the cell.

When a first repetition of a PUCCH transmission is on a first cell using a first SCS configuration $\mu_1$ and a second repetition of the PUCCH transmission is on a second cell using a second SCS configuration $\mu_2$ (where $\mu_1 < \mu_2$), and a number of repetitions for the PUCCH transmission is $N_{PUCCH}^{repeat}$, the number of repetitions needs to be defined relative to an SCS configuration because a duration of a repetition is smaller on the second cell than on the first cell and a coverage limited UE may not be able to increase a PUCCH transmission power on the second in order to compensate for the smaller duration of the repetition. For example, the $N_{PUCCH}^{repeat}$ repetitions can be defined relative to a smallest SCS configuration $\mu_{min}$, or relative to a largest SCS configuration $\mu_{max}$, or relative to the SCS configuration for PUCCH transmissions on the primary cell, among the SCS configurations for PUCCH transmissions on cells where the UE can transmit a repetition. For example, the $N_{PUCCH}^{repeat}$ repetitions can be defined relative to the SCS configuration $\mu_{PCell}$ of the PUCCH transmissions on the primary cell. For example, the $N_{PUCCH}^{repeat}$ repetitions can be defined relative to a reference SCS configuration $\mu_{ref}$. In the following, the $N_{PUCCH}^{repeat}$ repetitions are considered relative to the SCS configuration of the primary cell, but the embodiment remains directly applicable if the $N_{PUCCH}^{repeat}$ repetitions are defined relative to another SCS configuration.

For repetitions over a same number of REs for UCI symbols in respective slots, such as for repetitions over a same number of symbols and RBs per slot, a repetition using SCS configuration $\mu$ is equivalent to $2^{(\mu_{PCell}-\mu)}$ repetitions on a slot of the primary cell. A serving gNB can apply a weighting/scaling by $2^{(\mu_{PCell}-\mu)}$ to symbols of a repetition for a PUCCH that is received with SCS configuration $\mu$ prior to combining with symbols from previously received repetitions of the PUCCH. Denoting by $n_{PUCCH}^{repeat,\mu_j}$ a number of repetitions on a cell with SCS configuration $\mu_j$, when Equation (4) is satisfied, the UE continues with the PUCCH repetitions; otherwise, when after a repetition when Equation (5) is satisfied, the UE stops the PUCCH repetitions.

$$\Sigma_{\mu_j} n_{PUCCH}^{repeat,\mu_j} \cdot 2(\mu_{PCell}-\mu_j) < N_{PUCCH}^{repeat} \quad (4)$$

$$\Sigma_{\mu_j} n_{PUCCH}^{repeat,\mu_j} \cdot 2(\mu_{PCell}-\mu_j) \leq N_{PUCCH}^{repeat} \quad (5)$$

Therefore, when repetitions of a PUCCH transmission use different SCS configurations on different cells, a number of actual repetitions can be different than $N_{PUCCH}^{repeat}$ that can be viewed as a number of nominal PUCCH repetitions. A same approach can apply for defining and counting a number of repetitions for a PUSCH transmission. For a PUSCH transmission with Type-B repetitions, the definition and counting can apply for the nominal repetitions. The above approaches can be applicable when a UE does not increase a power for a repetition of a PUCCH transmission on cells with larger SCS configuration for the repetition, such as when the UE is coverage limited and is already transmitting with a power near or at a maximum transmission power.

The method 1300 as illustrated in FIG. 13 describes a procedure for a UE to determine a number of repetitions for a PUCCH transmission when the UE can transmit the repetitions of the PUCCH on cells using different SCS configuration according to embodiments of this disclosure.

In step 1310, a UE (such as the UE 116) is provided by higher layers a set of cells for repetitions of a PUCCH transmission. In step 1320, the UE determines a number of $N_{PUCCH}^{repeat}$ repetitions for a PUCCH transmission, for example as previously described, wherein $N_{PUCCH}^{repeat}$ is defined relative to a SCS configuration $\mu_{PCell}$ for PUCCH transmissions on a primary cell. In step 1330, the UE determines a cell for a repetition of the PUCCH transmission, for example using one of the previously described approaches, wherein the UE transmits the repetition of the PUCCH using SCS configuration $\mu$. In step 1340, the UE counts the repetition by adding a value of $2^{(\mu_{PCell}-\mu)}$ to a previous/existing number of repetitions for the PUCCH transmission.

It is also possible that instead of $\mu_{PCell}$, another SCS configuration is used as a reference SCS configuration for defining, scaling, and counting repetitions of the PUCCH transmission as it was previously described.

For repetitions of a PUCCH transmission that includes a UCI payload smaller than 12 bits, a number of REs that include UCI symbols can vary per repetition. Then, in addition to scaling a count of a repetition for a PUCCH according to an SCS configuration of the PUCCH relative to a reference configuration, a scaling can additionally consider the number of REs used to provide UCI symbols in the repetition of the PUCCH. For example, for a repetition of a PUCCH transmission on a cell that is over $N_{RB}$ RBs and over $N_{symbol}$ symbols, the repetition is scaled by Equation (6).

$$(N_{RB} \cdot N_{symbol})/(N_{RB,ref} \cdot N_{symbol,ref}) \quad (6)$$

In Equation (6), $N_{RB}$,ref is a reference number of RBs and $N_{symbol,ref}$ is a reference number of symbols. For example, $N_{RB}$,ref and $N_{symbol,ref}$ can correspond to a PUCCH resource for a PUCCH transmission on the primary cell that is configured by higher layers or is indicated by a DCI format associated with the PUCCH transmission. For example, $N_{RB,ref}=1$ and $N_{symbol,ref}=14$. For example, for $N_{RB}=1$ for all repetitions and for $N_{RB,ref}=1$, a count for a repetition over $N_{symbol}$ symbols is scaled by $N_{symbol}/N_{symbol,ref}$.

The mechanisms for supporting repetitions of a PUCCH transmission on multiple cells can also apply for determining a number of slots where a UE postpones a PUCCH transmission, regardless of whether or not the PUCCH transmission is with repetitions. With reference to slots of a PUCCH transmission on a primary cell, a UE can postpone a PUCCH transmission with HARQ-ACK information in response to SPS PDSCH receptions for a maximum number of slots, from a slot indicated by a DCI format activating the SPS PDSCH receptions, until a valid PUCCH resource is available for the PUCCH transmission. The maximum number of slots can be indicated by a higher layer parameter or can be indicated by using available (not used for other purpose) bits of one or more fields in a DCI format activating the SPS PDSCH receptions. When the UE is configured to transmit a PUCCH on any cell from the set of cells, the UE considers availability of a valid PUCCH resource for a PUCCH transmission over all cells from the set of cells while the UE counts slots only on the primary cell. For example, when a SCS configuration for PUCCH transmission on an SCell is twice the SCS configuration for PUCCH transmission on the primary cell, there are twice as many slots on the SCell than on the primary cell during a duration corresponding to a maximum number of slots on the primary cell, but the UE counts the slots on the primary cell against the maximum number of slots. Alternatively, the UE can be provided by higher layer a maximum time, for example in milliseconds, that the UE can postpone a PUCCH transmission until a valid PUCCH resource is available for the PUCCH transmission.

Although FIG. 11 illustrates the method 1100, the FIG. 12 illustrates the method 1200, and the FIG. 13 illustrates the method 1300 various changes may be made to FIGS. 11-13. For example, while the method 1100, the method 1200, and the method 1300 are shown as a series of steps, various steps could overlap, occur in parallel, occur in a different order, or occur multiple times. In another example, steps may be omitted or replaced by other steps. For example, steps of the method 1100, the method 1200, and the method 1300 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   receiving:
   a bitmap mapping to a number of slots on a primary cell, wherein:
   the mapping repeats periodically over the number of slots, and
   the bitmap indicates the primary cell or a secondary cell,
   information for first parameters associated with transmission of a physical uplink control channel (PUCCH) on the primary cell, and
   information for second parameters associated with transmission of a PUCCH on the secondary cell;
   determining, based on the bitmap, a first cell to transmit a first PUCCH in a slot of the first cell; and
   transmitting the first PUCCH in the slot on the first cell.

2. The method of claim 1, wherein:
   one slot on the primary cell overlaps with more than one slots on the secondary cell,
   the first cell is the secondary cell, and
   transmitting the first PUCCH comprises transmitting the first PUCCH on an earliest slot from the more than one slots on the secondary cell.

3. The method of claim 1, further comprising receiving a downlink control information (DCI) format, wherein the DCI format includes a field with a value indicating a slot on the primary cell for transmission of the first PUCCH.

4. The method of claim 1, further comprising:
determining:
- a first power, based on first power control parameters if the first cell is the primary cell, wherein the first power control parameters are from the first parameters, and
- a second power, based on second power control parameters, if the first cell is the secondary cell, wherein the second power control parameters are from the second parameters; and transmitting the first PUCCH using one of the first power or the second power.

5. The method of claim 1, further comprising:
determining, based on the bitmap, a second cell to transmit a second repetition of the first PUCCH, wherein:
- the second cell is the secondary cell, and
- one slot on the primary cell overlaps with more than one slots on the secondary cell; and transmitting the second repetition of the first PUCCH over the more than one slots on the secondary cell.

6. The method of claim 1, further comprising:
receiving information for a maximum number of slots on the primary cell for postponing transmission of a second PUCCH;

determining:
- that the second PUCCH cannot be transmitted in a slot on a second cell, wherein the slot on the second cell overlaps with a first slot on the primary cell,
- a third cell, based on the bitmap, to transmit the second PUCCH in a slot on the third cell, wherein the slot on the third cell overlaps with a next slot after the first slot on the primary cell, and
- that the PUCCH can be transmitted in the slot on the third cell; and transmitting the second PUCCH in the slot on the third cell.

7. The method of claim 6, wherein the second PUCCH includes hybrid automatic repeat request acknowledgement (HARQ-ACK) information associated with semi-persistently scheduled (SPS) receptions of physical downlink shared channels (PDSCHs).

8. A user equipment (UE) comprising:
a transceiver configured to receive:
- a bitmap mapping to a number of slots on a primary cell, wherein:
  - the mapping repeats periodically over the number of slots, and
  - the bitmap indicates the primary cell or a secondary cell,
- information for first parameters associated with transmission of a physical uplink control channel (PUCCH) on the primary cell, and
- information for second parameters associated with transmission of a PUCCH on the secondary cell; and a processor operably coupled to the transceiver, the processor configured to determine, based on the bitmap, a first cell to transmit a first PUCCH in a slot of the first cell, wherein the transceiver is further configured to transmit the first PUCCH in the slot on the first cell.

9. The UE of claim 8, wherein:
one slot on the primary cell overlaps with more than one slots on the secondary cell,
the first cell is the secondary cell, and
the transceiver is configured to transmit the first PUCCH on an earliest slot from the more than one slots on the secondary cell.

10. The UE of claim 8, wherein the transceiver is further configured to receive a downlink control information (DCI) format, wherein the DCI format includes a field with a value indicating a slot on the primary cell for transmission of the first PUCCH.

11. The UE of claim 8, wherein:
the processor is further configured to determine:
- a first power, based on first power control parameters if the first cell is the primary cell, wherein the first power control parameters are from the first parameters, and
- a second power, based on second power control parameters, if the first cell is the secondary cell, wherein the second power control parameters are from the second parameters; and the transceiver is further configured to transmit the first PUCCH using one of the first power or the second power.

12. The UE of claim 8, wherein:
the processor is further configured to determine, based on the bitmap, a second cell to transmit a second repetition of the first PUCCH, wherein:
- the second cell is the secondary cell, and
- one slot on the primary cell overlaps with more than one slots on the secondary cell; and the transceiver is further configured to transmit the second repetition of the first PUCCH over the more than one slots on the secondary cell.

13. The UE of claim 8, wherein:
the transceiver is further configured to receive information for a maximum number of slots on the primary cell for postponing transmission of a second PUCCH;
the processor is further configured to determine:
- that the second PUCCH cannot be transmitted in a slot on a second cell, wherein the slot on the second cell overlaps with a first slot on the primary cell,
- a third cell, based on the bitmap, to transmit the second PUCCH in a slot on the third cell, wherein the slot on the third cell overlaps with a next slot after the first slot on the primary cell, and
- that the PUCCH can be transmitted in the slot on the third cell; and the transceiver is further configured to transmit the second PUCCH in the slot on the third cell.

14. The UE of claim 13, wherein the second PUCCH includes hybrid automatic repeat request acknowledgement (HARQ-ACK) information associated with semi-persistently scheduled (SPS) receptions of physical downlink shared channels (PDSCHs).

15. A base station comprising:
a transceiver configured to transmit:
- a bitmap mapping to a number of slots on a primary cell, wherein:
  - the mapping repeats periodically over the number of slots, and
  - the bitmap indicates the primary cell or a secondary cell,
- information for first parameters associated with transmission of a physical uplink control channel (PUCCH) on the primary cell, and
- information for second parameters associated with transmission of a PUCCH on the secondary cell; and a processor operably coupled to the transceiver, the processor configured to determine, based on the bitmap, a first cell to receive a first PUCCH in a slot of the first cell, wherein the transceiver is further configured to receive the first PUCCH in the slot on the first cell.

16. The base station of claim 15, wherein:
one slot on the primary cell overlaps with more than one slots on the secondary cell,
the first cell is the secondary cell, and
the transceiver is configured to receive the first PUCCH is on an earliest slot from the more than one slots on the secondary cell.

17. The base station of claim 15, wherein the transceiver is further configured to transmit a downlink control information (DCI) format, wherein the DCI format includes a field with a value indicating a slot on the primary cell for reception of the first PUCCH.

18. The base station of claim 15, wherein:
the processor is further configured to determine, based on the bitmap, a second cell to receive a second repetition of the first PUCCH, wherein:
the second cell is the secondary cell, and
one slot on the primary cell overlaps with more than one slots on the secondary cell; and
the transceiver is further configured to receive the second repetition of the first PUCCH over the more than one slots on the secondary cell.

19. The base station of claim 15, wherein:
the transceiver is further configured to transmit information for a maximum number of slots on the primary cell for postponing transmission of a second PUCCH;
the processor is further configured to determine:
that the second PUCCH cannot be received in a slot on a second cell, wherein the slot on the second cell overlaps with a first slot on the primary cell,
a third cell, based on the bitmap, to receive the second PUCCH in a slot on the third cell, wherein the slot on the third cell overlaps with a next slot after the first slot on the primary cell, and
that the PUCCH can be received in the slot on the third cell; and
the transceiver is further configured to receive the second PUCCH in the slot on the third cell.

20. The base station of claim 19, wherein the second PUCCH includes hybrid automatic repeat request acknowledgement (HARQ-ACK) information associated with semi-persistently scheduled (SPS) transmissions of physical downlink shared channels (PDSCHs).

* * * * *